United States Patent [19]

Wakatake

[11] Patent Number: 5,299,061
[45] Date of Patent: Mar. 29, 1994

[54] PSEUDO-LUMINOUS PANEL, OPTICAL COLOR FILTER THEREFOR, AND DISPLAY ELEMENT AND DEVICE USING THE PSEUDO-LUMINOUS PANEL

[75] Inventor: Yoshimasa Wakatake, Tokyo, Japan

[73] Assignee: Masayuki Wakatake, Happy Valley, Hong Kong; a part interest

[21] Appl. No.: 971,154

[22] Filed: Nov. 4, 1992

[51] Int. Cl.$^5$ .................. G02B 5/136; G02B 5/28; G02B 5/02; G09F 13/16

[52] U.S. Cl. .................. 359/547; 359/546; 359/548; 359/530; 359/547; 359/599; 40/582

[58] Field of Search ............... 359/454, 455, 456, 457, 359/459, 530, 542, 546, 599, 615, 547, 548; 40/528, 582, 583, 612

[56] References Cited

U.S. PATENT DOCUMENTS

| | | | |
|---|---|---|---|
| 4,040,760 | 8/1977 | Wyckoff | 40/612 |
| 4,229,085 | 10/1980 | Yamada et al. | 359/459 |
| 4,231,830 | 11/1980 | Ryan et al. | 40/582 |

FOREIGN PATENT DOCUMENTS 2472197  6/1981  France ................... 359/457

Primary Examiner—Bruce Y. Arnold
Assistant Examiner—Thomas Robbins
Attorney, Agent, or Firm—Sixbey, Friedman, Leedom & Ferguson

[57] ABSTRACT

A pseudo-luminous panel has an optical color filter and a reflecting film formed all over the back thereof. The surface of the optical color filter is formed by obliquely downward and upward band-like surface portions alternately arranged side by side in the vertical direction. The back face of the optical color filter is has obliquely upward band-like back face portions each on the opposite side from one of the obliquely downward band-like surface portions and obliquely downward band-like back face portions each on the opposite side from one of obliquely upward band-like surface portions. The obliquely downward band-like surface portions of the optical color filter are each a smooth surface extending straight in the longitudinal section of the panel. The obliquely upward band-like surface portions of the optical color filter are each a rough surface. The obliquely upward band-like back face portions of the optical color filter are each a smooth surface. The obliquely downward band-like surface portions of the optical color filter are each a smooth, irregular or uneven surface. The surface (i.e. the reflecting surface) of the reflecting film is formed by the back of the optical color filter.

11 Claims, 16 Drawing Sheets

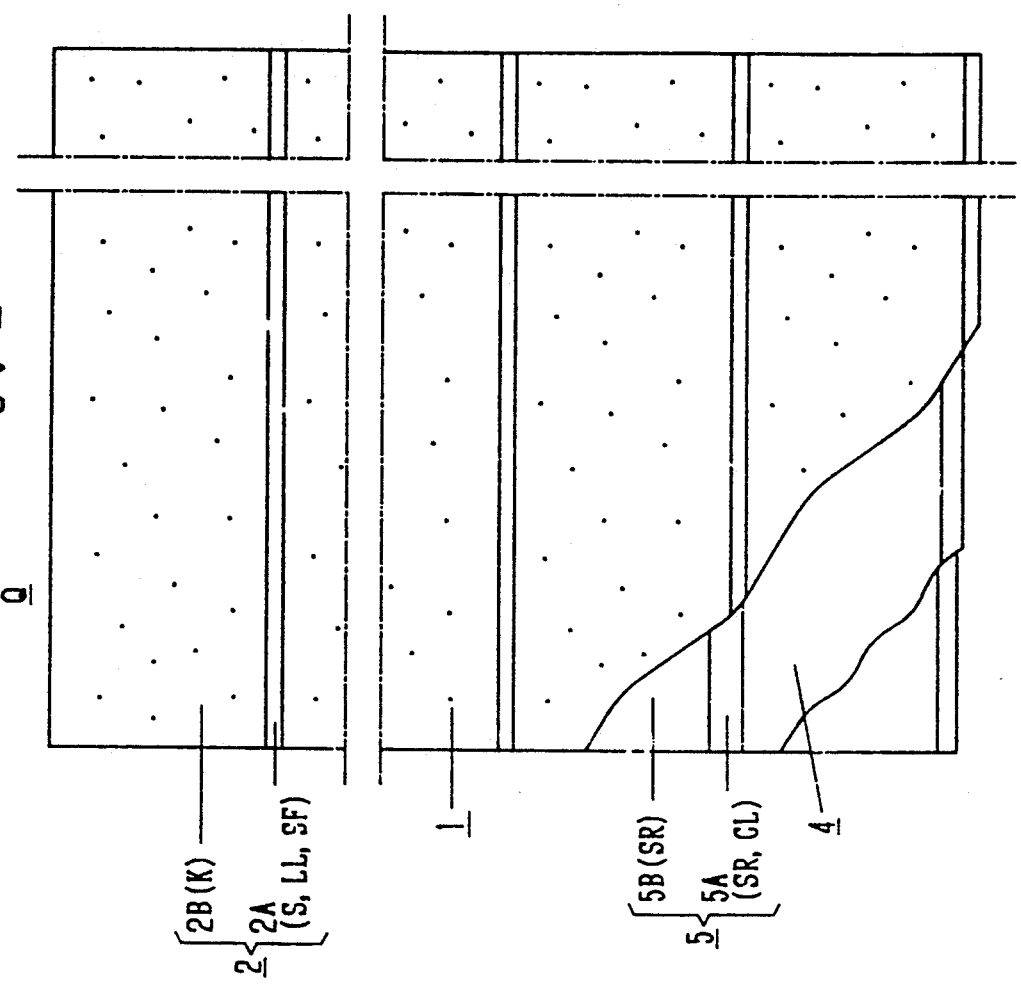
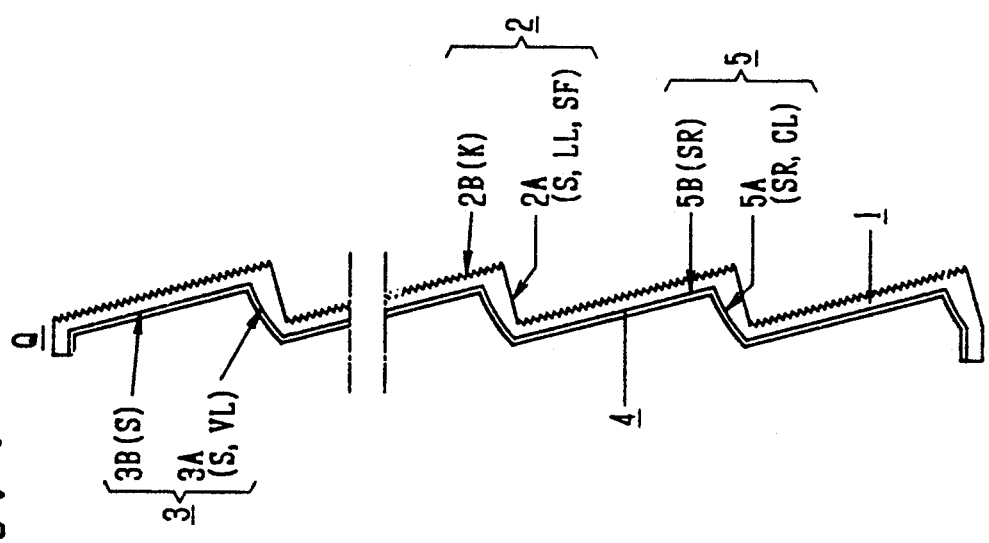

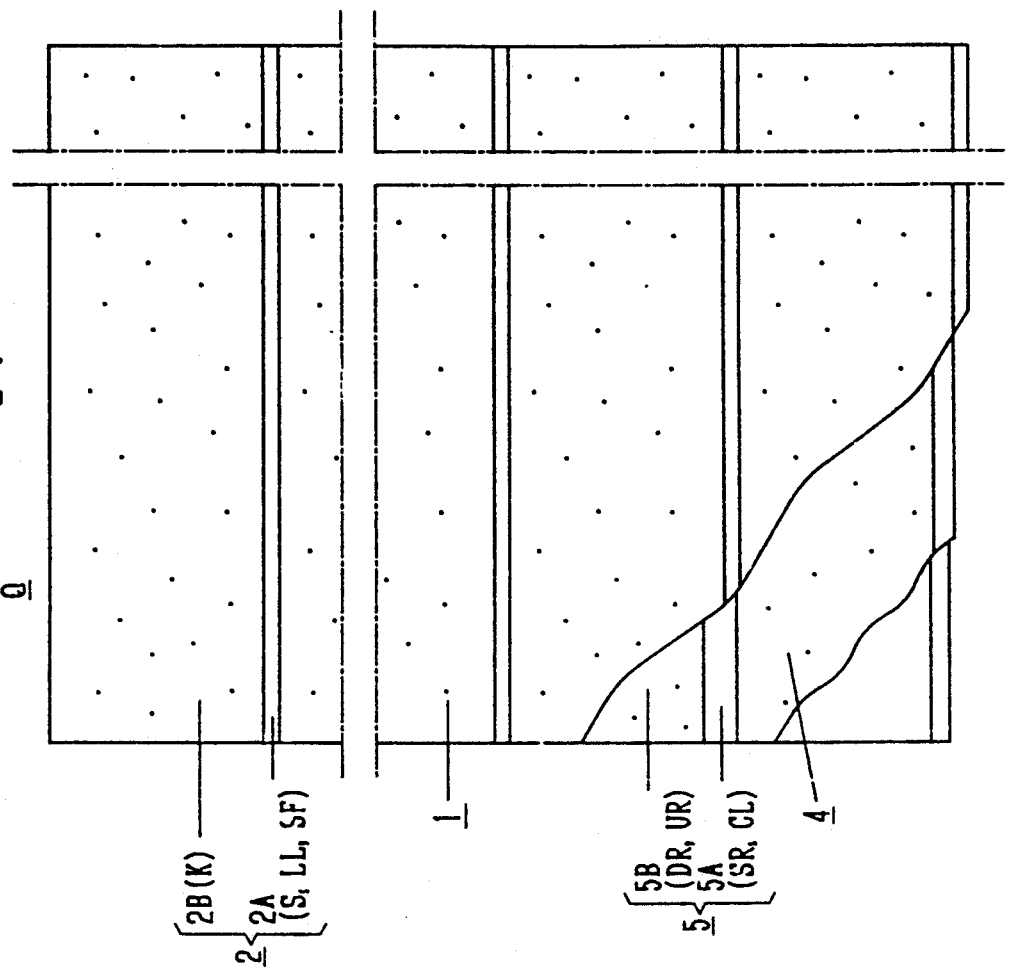
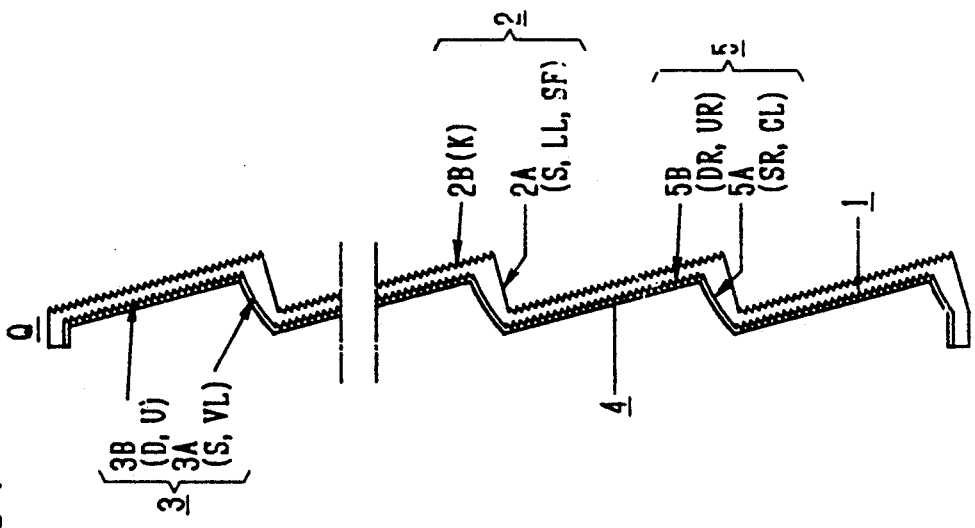

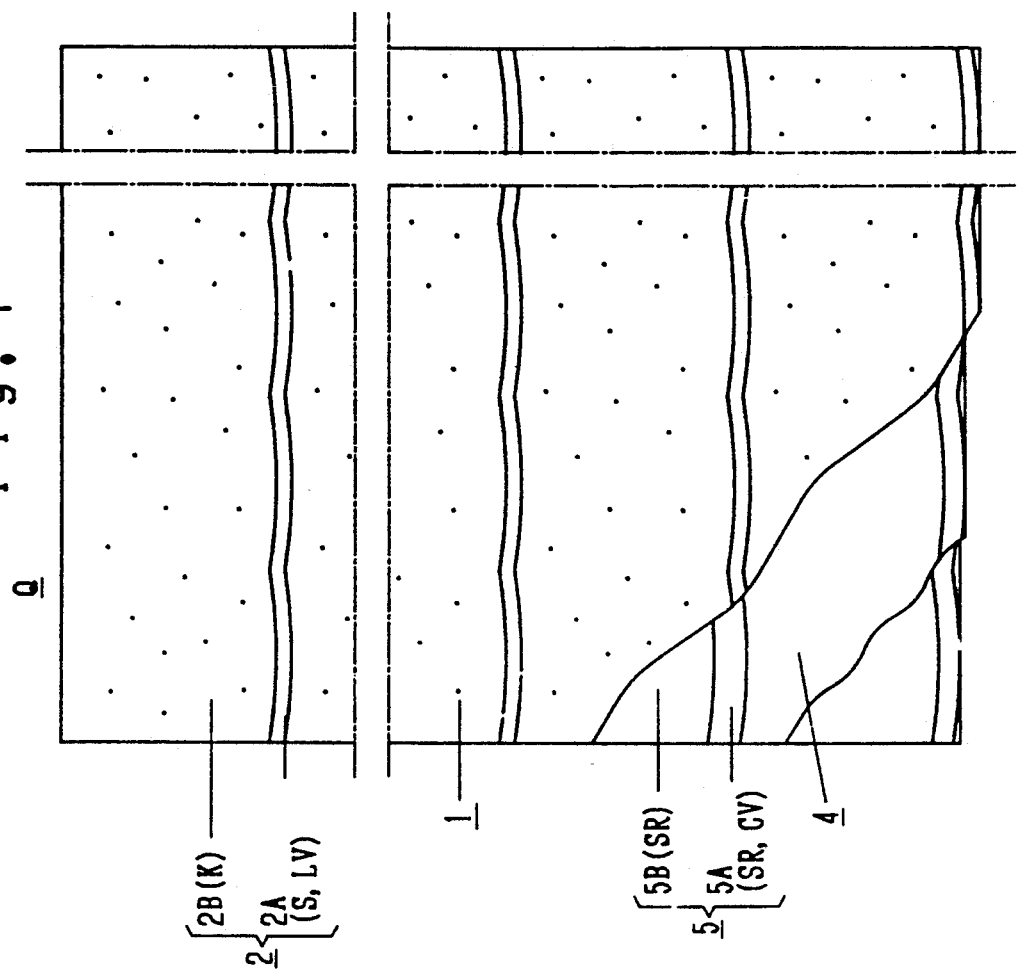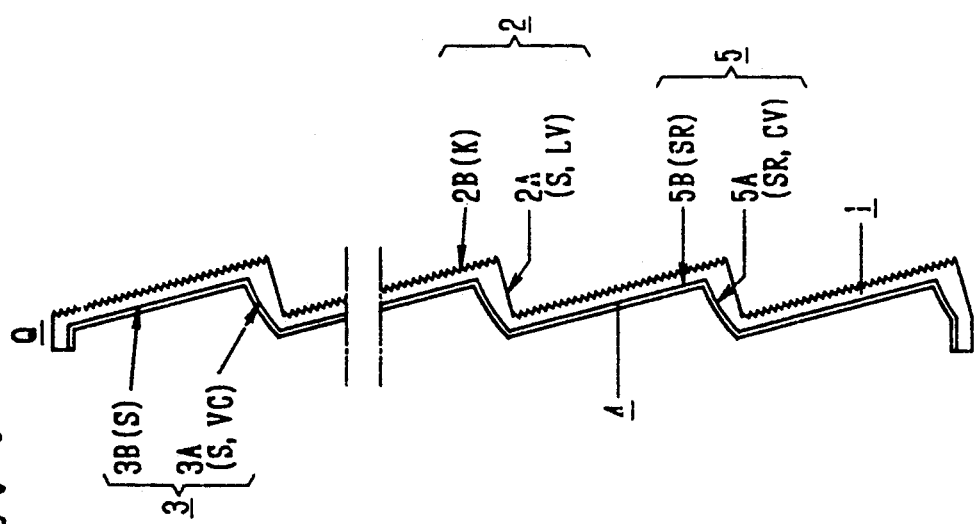

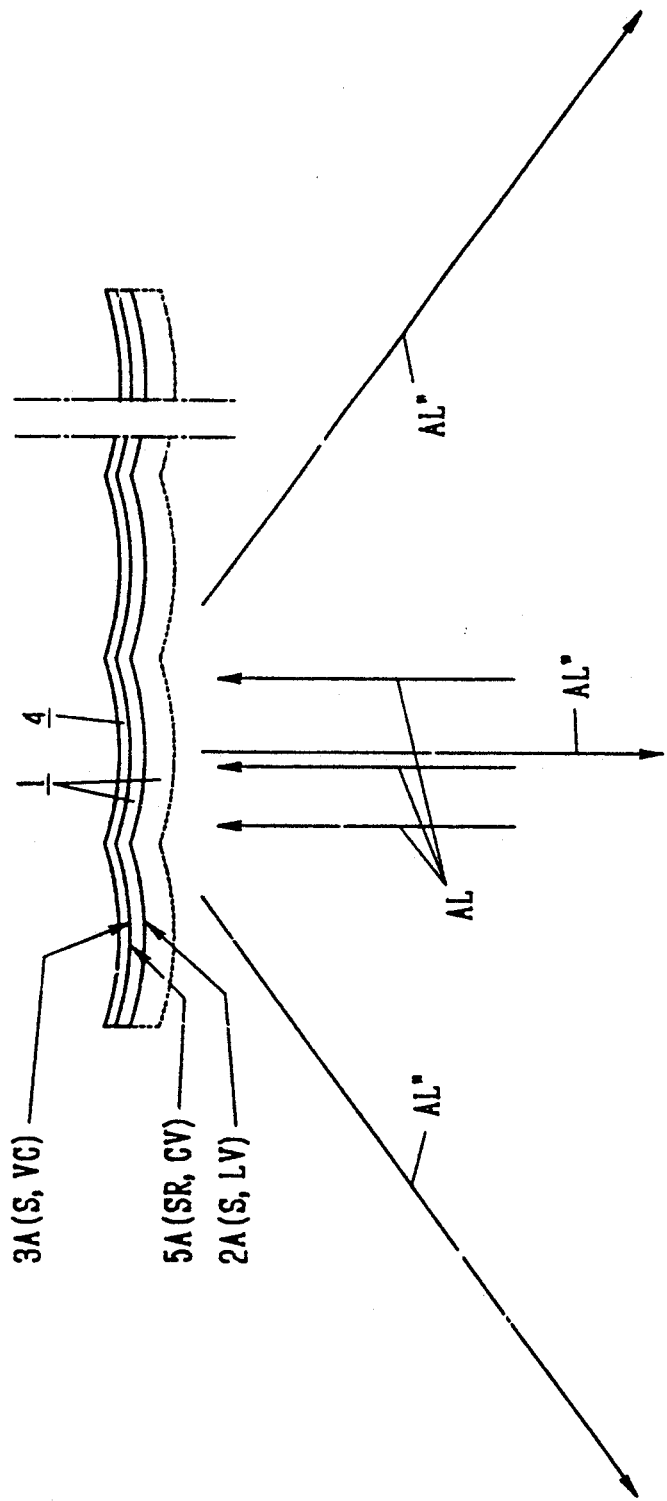

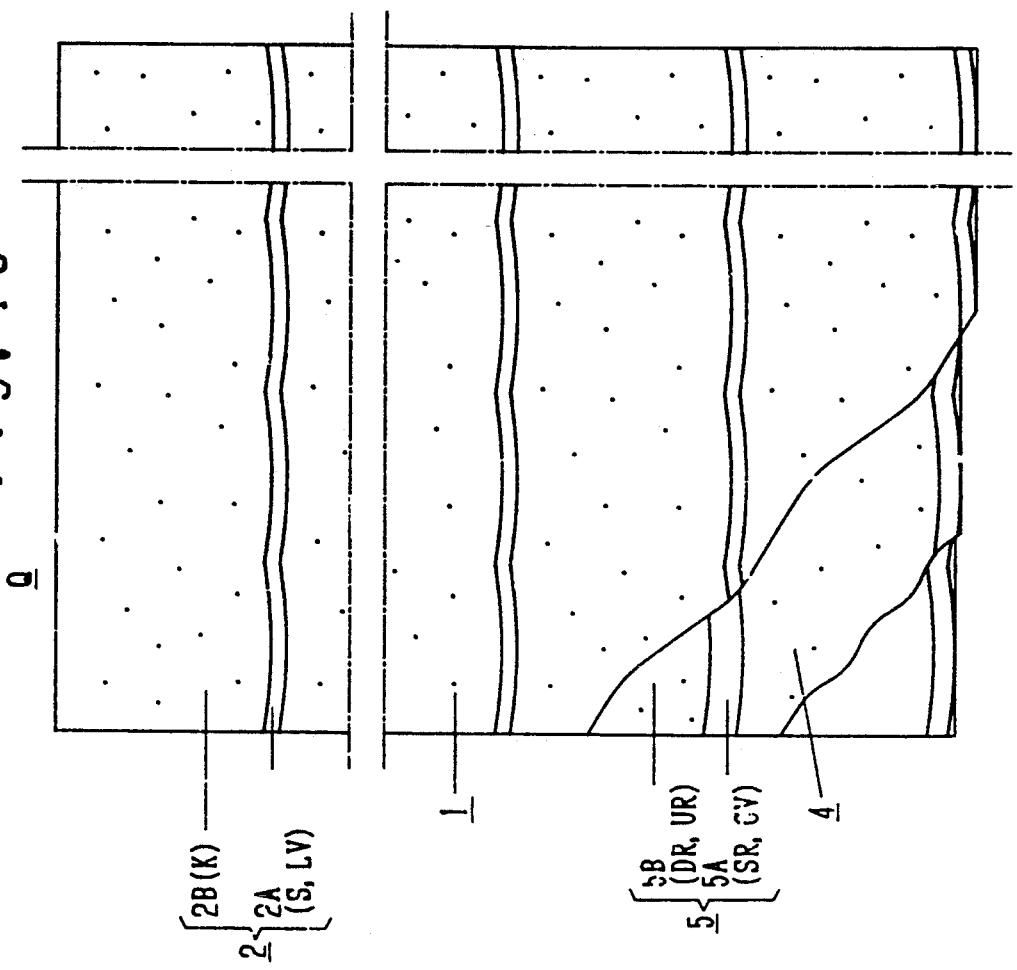
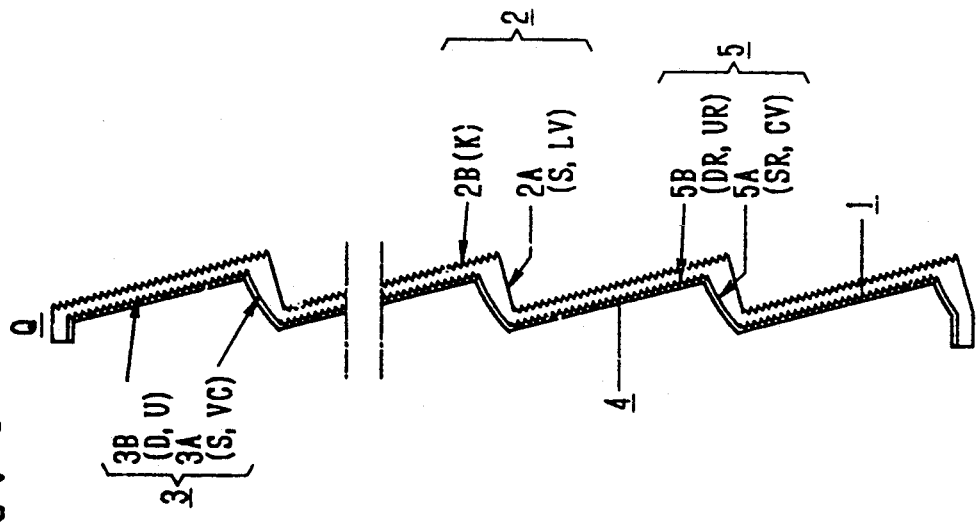

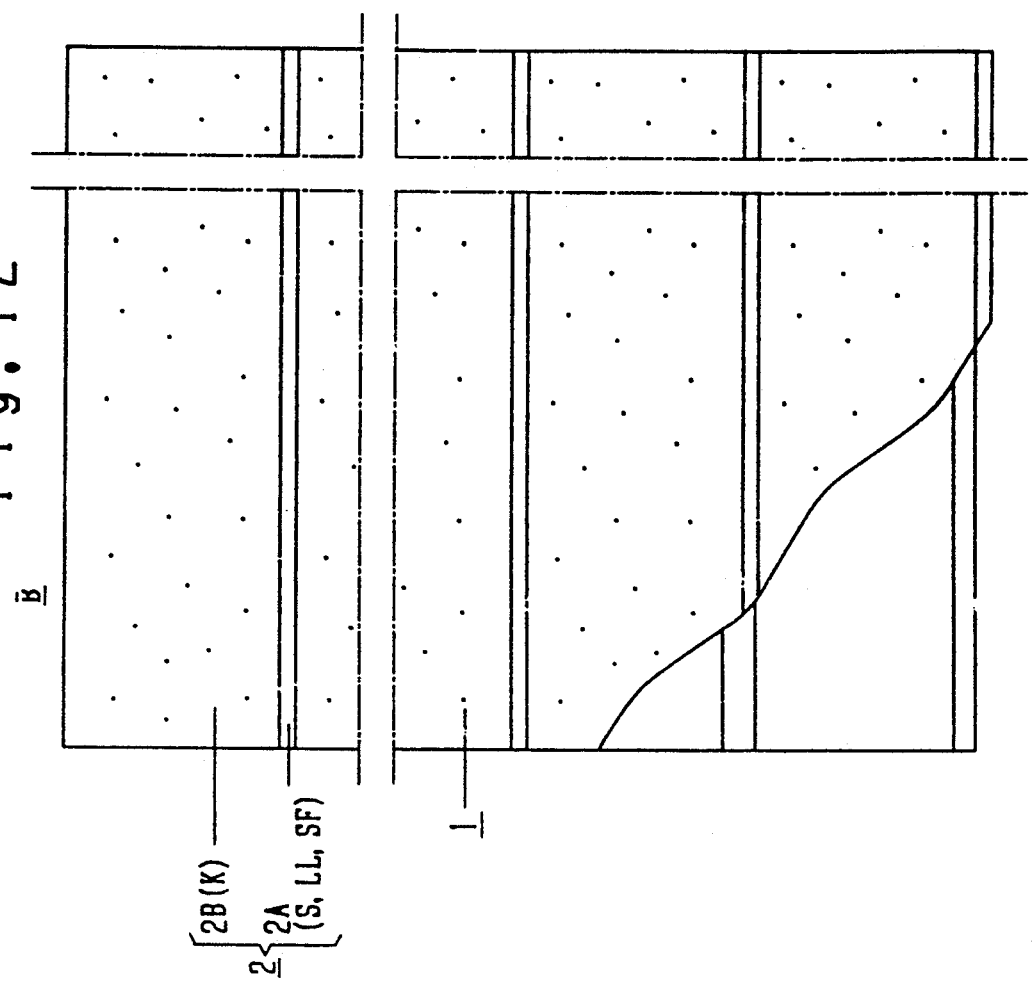
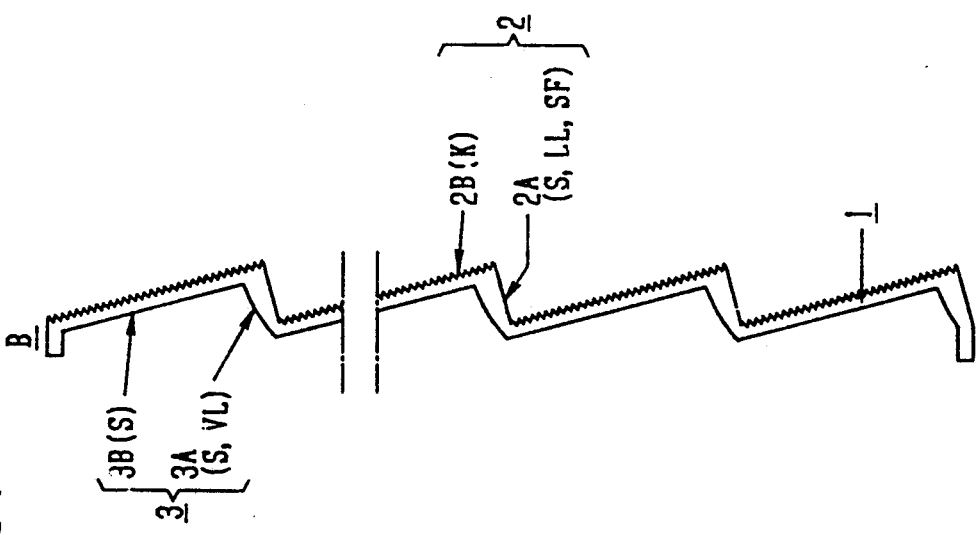

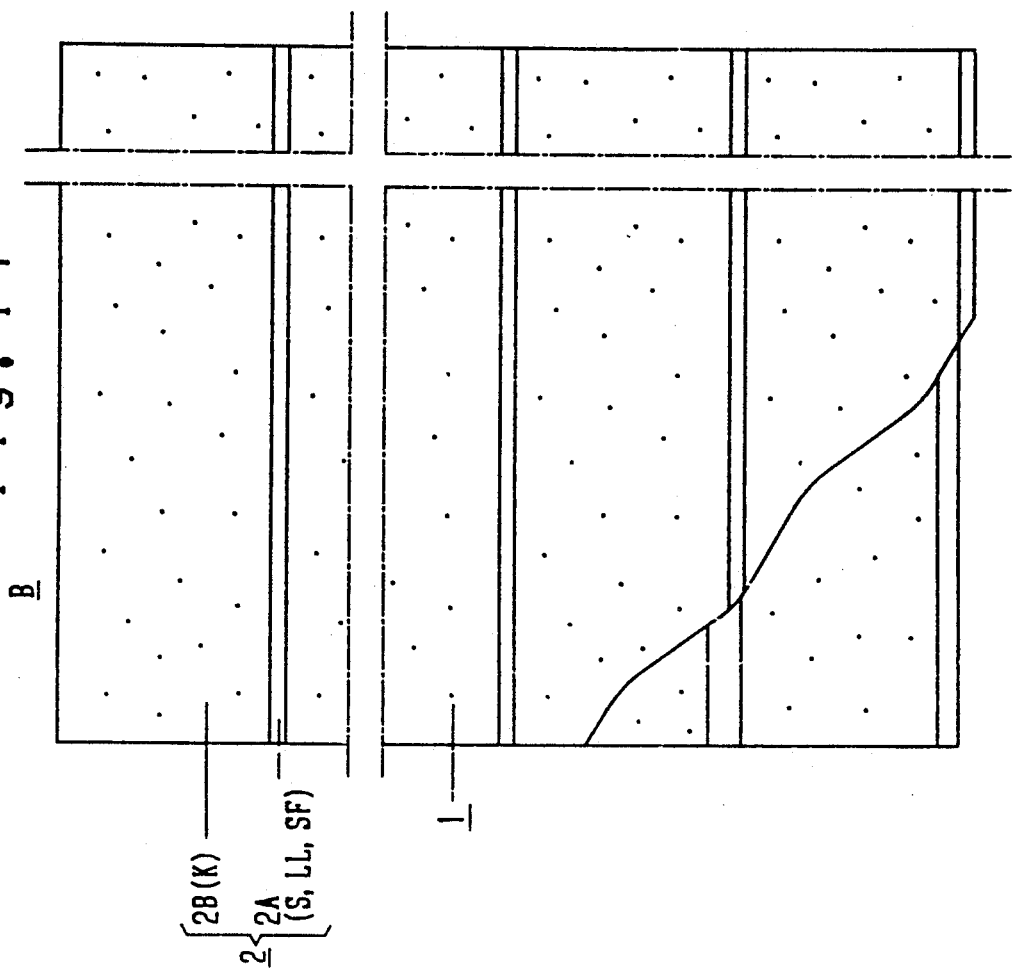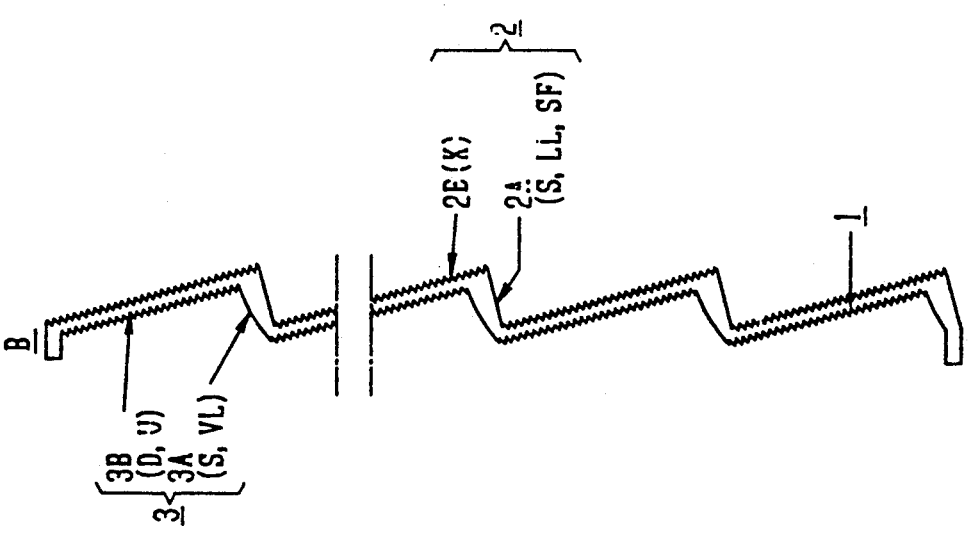

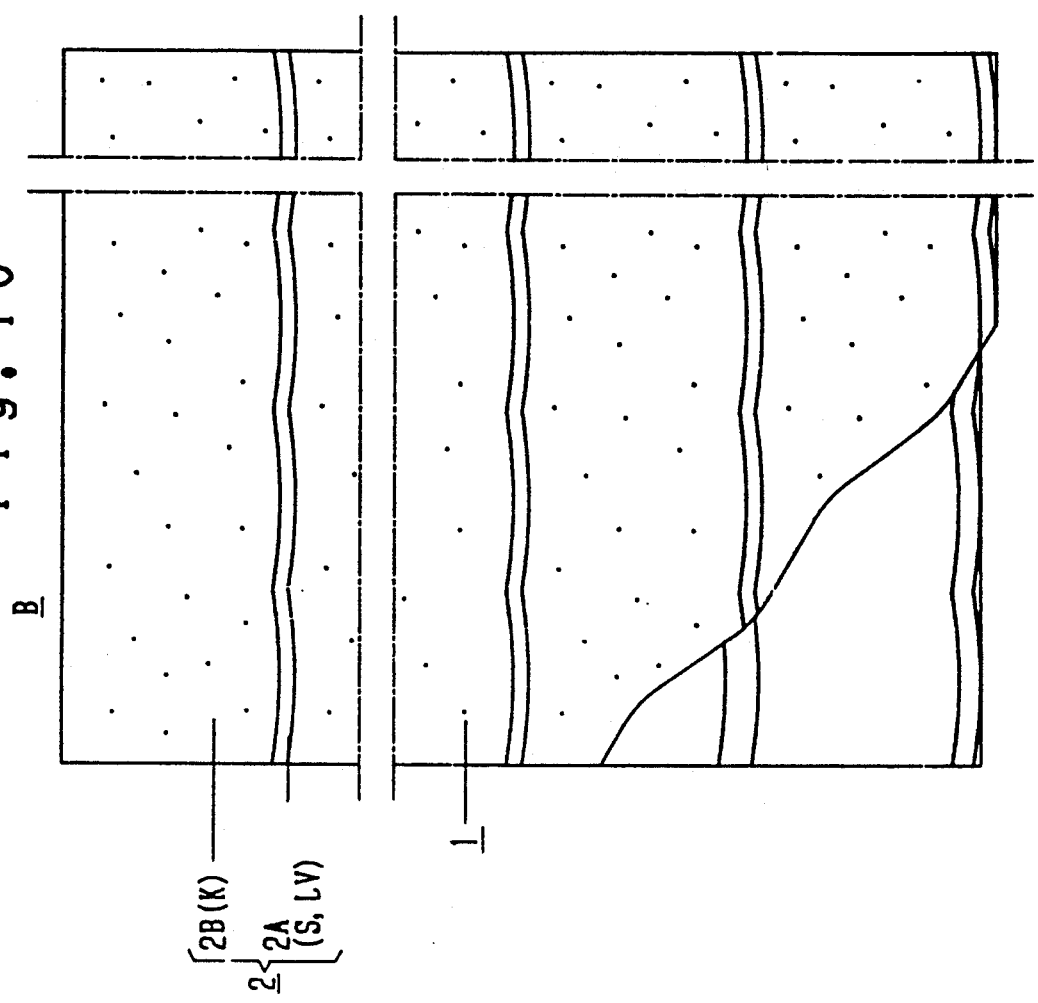
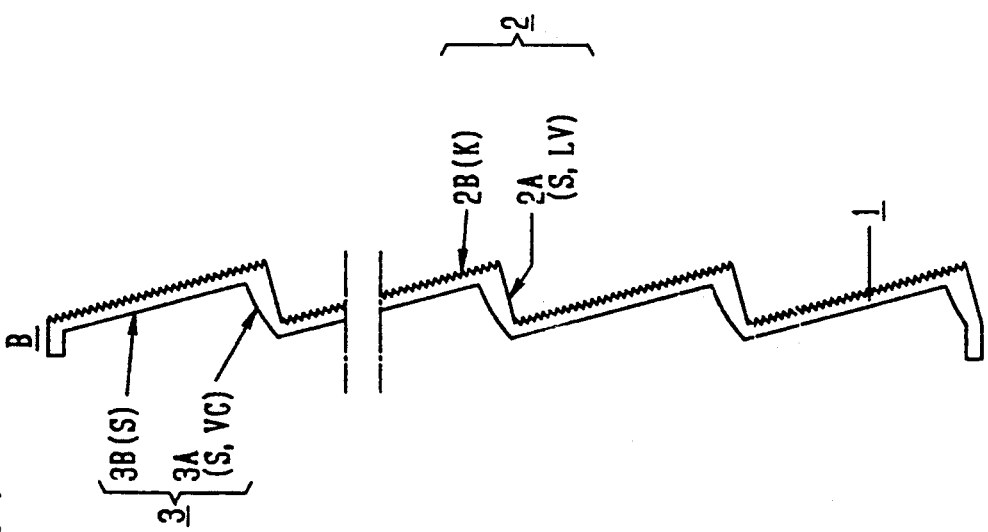

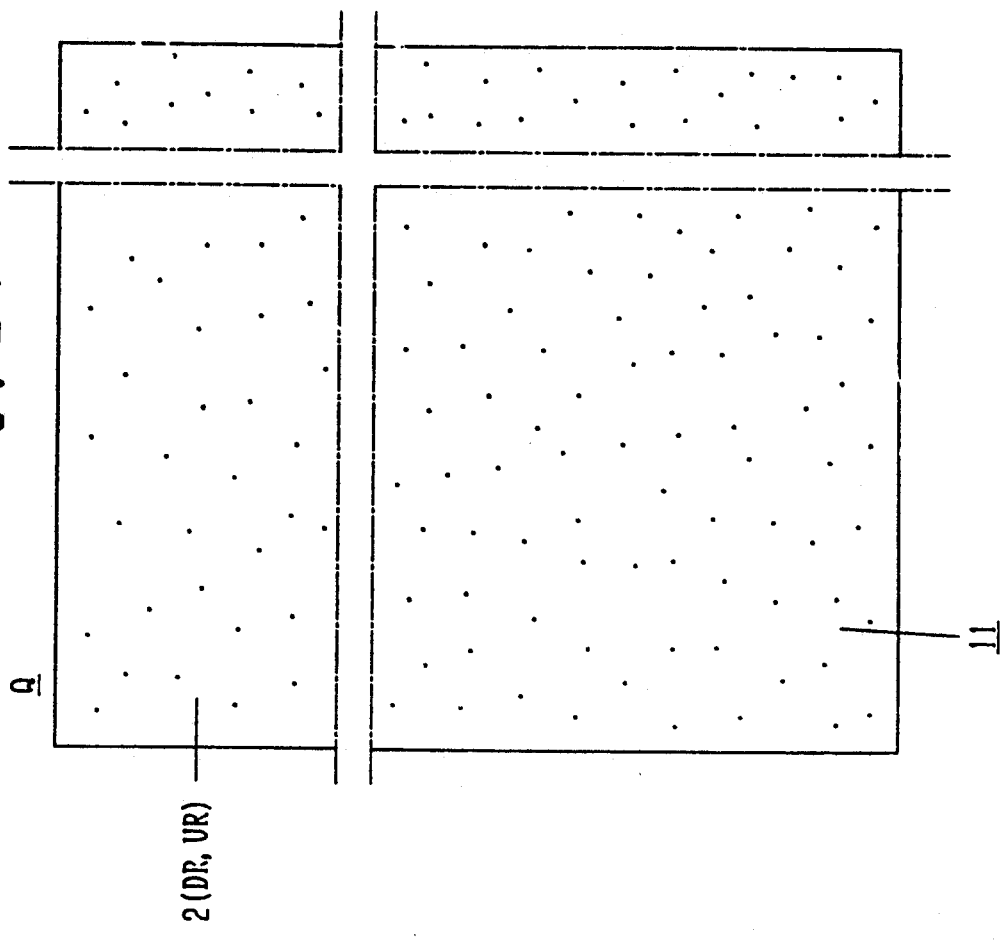
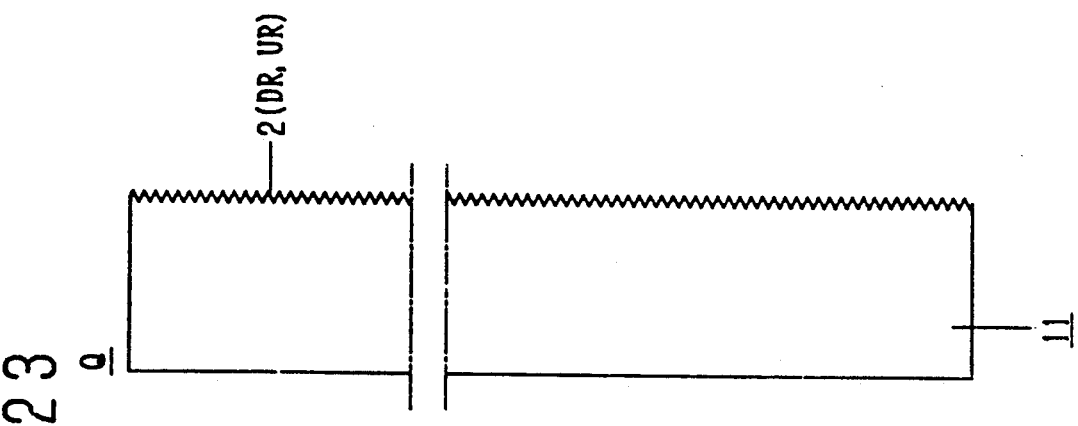

PSEUDO-LUMINOUS PANEL, OPTICAL COLOR FILTER THEREFOR, AND DISPLAY ELEMENT AND DEVICE USING THE PSEUDO-LUMINOUS PANEL

BACKGROUND OF THE INVENTION

1. Field of the Invention

The present invention relates to a pseudo-luminous panel, an optical color filter therefor, and a display element and a display device employing the pseudo-luminous panel.

2. Description of the Prior Art

FIGS. 23 and 24 show a conventional pseudo-luminous panel Q which has, for example, a square substrate 11 the main surface 2 of which is formed by an irregular or uneven reflection surface DR or UR extending in a vertical plane.

When such a conventional pseudo-luminous panel Q is disposed outdoors, for example, high above the ground G by use of a support H as shown in FIG. 25, the main surface 2 of the substrate 11 is directly irradiated over the entire area thereof by sunlight SL from above diagonally to the front of the substrate 11 in the daytime. In other word, the sunlight SL directly illuminates the main surface 2 of the substrate 11 over the entire area thereof from above diagonally to the front of the substrate 11. The sunlight SL thus falling on the main surface 2 of the substrate 11 enters thereinto. In this instance, since the main surface 2 of the substrate 11 is the irregular or uneven reflection surface DR or UR, the sunlight SL incident on such a main surface 2 irregularly enters therethrough into the substrate 11. The sunlight SL thus having irregularly entered into the substrate 11 is irregularly reflected therein. The irregularly reflected light is emitted forwardly of the pseudo-luminous panel Q through the main surface 2 of the substrate 11. In this case, the irregularly reflected light is irregularly emitted from the panel Q, since the main surface 2 is formed by the irregular or uneven reflection surface DR or UR as mentioned above. Thus, scattered light SL' derived from the sunlight SL is obtained in front of the pseudo-luminous panel Q.

The scattered light SL' results from the passage through the portion of the main surface 2 side of the substrate 11, and hence has a hue corresponding to the pass band of the main surface portion of the substrate 11 in terms of its band pass characteristic. A portion of the scattered light SL' emitted from the pseudo-luminous panel Q is directed toward the ground G. Hence, in the daytime a person M standing on the ground G diagonally below the pseudo-luminous panel Q can perceive a pattern of the main surface 2 in a color tone corresponding to the pass band of the main surface portion of the substrate 11.

When irradiating the pseudo-luminous panel Q, at night, by artificial light AL of a band covering the pass band of the main surface portion of the substrate 11 from a projector P disposed on the ground G diagonally below to the front of the panel Q, as shown in FIG. 25, the artificial light AL irregularly enters into the main surface portion of the substrate 11 through the main surface 2 and is then irregularly reflected and the irregularly reflected light is emitted as scattered light AL' from the pseudo-luminous panel Q through the main surface 2 of the substrate 11.

As is the case with the scattered light SL', the scattered light AL' also results from the passage through the main surface portion of the substrate 11, and hence has the hue corresponding to the pass band of the main surface portion of the substrate 11, and a portion of scattered light AL' is directed to the ground G. Accordingly, the person M on the ground G can perceive the pattern of the main surface 2 of the substrate 11 in a color tone corresponding to the pass band of the main surface portion of the substrate 11.

Thus, in the case where the conventional pseudo-luminous panel Q shown in FIGS. 23 and 24 is disposed outdoors, for example, high above the ground G and is irradiated by the sunlight SL in the daytime and by the artificial light AL from the projector P at night as described above, it is possible to make the person M on the ground G perceive day and night the pattern of the main surface 2 of the substrate 11 in the hue corresponding to the pass band of the main surface portion of the substrate 11.

Incidentally, the energy of the artificial light AL from the projector P is far lower than the energy of the sunlight SL owing to a limitation on the manufacture of the projector P and for some other reasons. Hence, there is a markedly large difference between the energy of the sunlight SL received by the pseudo-luminous panel Q in the daytime and the energy of the artificial light AL illuminating the panel Q at night. In the daytime the viewer M perceives the pattern of the main surface 2 of the substrate 11 by a portion of the scattered light SL' caused by irregular reflection of the sunlight SL and at night he perceives the pattern of the main surface 2 by a portion of the scattered light AL' similarly caused by irregular reflection of the artificial light AL.

On this account, the conventional pseudo-luminous panel Q depicted in FIGS. 23 and 24 is defective in that when the substrate 11 is made relatively highly reflective by a suitable selection of its material so as to permit the viewer M to distinctly recognize the pattern of the main surface 2 of the substrate 11 at night, the pattern is so dazzling in the daytime that the viewer M may sometimes be unable to perceive the pattern itself.

Moreover, when the reflectivity of the substrate 11 is made low by a suitable selection of its material so that the pattern of the main surface 2 can clearly be recognized by the viewer M in the daytime, the pattern is very dark at night and in some cases it cannot be perceived in the color tone corresponding to the pass band of the main surface portion of the substrate 11.

SUMMARY OF THE INVENTION

It is therefore an object of the present invention to provide a novel pseudo-luminous panel which is free from the above-mentioned defects of the prior art, and an optical color filter for such a panel and a display element and a display device utilizing such a pseudo-luminous panel.

According to a first aspect of the present invention, an pseudo-luminous panel has an optical color filter and a reflecting film formed over the back face of the optical color filter. The surface of the optical color filter is composed of obliquely downward and upward band-like portions alternately arranged side by side in the vertical direction. The back face of the optical color filter is composed of obliquely upward band-like back face portions on the opposite side from the above-mentioned obliquely downward band-like surface portions and obliquely downward band-like back face portions on the opposite side from afore-mentioned obliquely upward band-like surface portions. The obliquely upward band-like back face portions of the optical color filter are each formed by a smooth surface, whereas the obliquely downward band-like back face portions are each formed by a smooth, irregular or uneven surface. The obliquely downward band-like surface portions of the optical color filter are each formed by a smooth surface which extends straight in the longitudinal section of the panel, whereas the obliquely upward band-like surface portions are each formed by a rough surface.

According to a second aspect of the present invention, a pseudo-luminous panel has an optical color filter and a reflecting film formed over the back face of the optical color filter. The surface of the optical filter is composed of obliquely downward and upward band-like portions alternately arranged side by side in the vertical direction. The back face of the optical color filter is composed of obliquely upward bank-like back face portions on the opposite side form the afore-mentioned obliquely downward band-like surface portions and obliquely downward band-like back face portions on the opposite side from the afore-mentioned upward band-like surface portions. The obliquely upward band-like back face portions of the optical color filter are each formed by a smooth surface which is curved convex obliquely upward in the longitudinal section of the panel, whereas the obliquely downward band-like back face portions are each formed by a smooth, irregular or uneven surface. The obliquely downward band-like surface portions of the optical filter are each formed by a smooth surface which extends straight in the longitudinal section of the panel, whereas the obliquely upward band-like surface portions are each formed by a rough surface.

According to a third aspect of the present invention, a pseudo-luminous panel has a construction wherein the afore-mentioned obliquely upward band-like back face portions of the optical color filter are each formed by a surface which extends straight widthwise of the panel according to the first or second aspect of the invention.

According to a fourth aspect of the present invention, a pseudo-luminous panel has a construction wherein the afore-mentioned obliquely upward band-like back face portions of the optical color filter are formed by surfaces which are each curved concave backwardly and are arranged side by side widthwise of the panel according to the first or second aspect of the invention.

According to a fifth aspect of the present invention, an optical color filter has a construction wherein its surface is composed of obliquely downward band-like surface portions and obliquely upward band-like surface portions alternately arranged side by side in the vertical direction and its back face is composed of obliquely upward band-like back face portions on the opposite side from the above-mentioned obliquely downward band-like surface portions and obliquely downward band-like back face portions on the opposite side from the above-mentioned obliquely upward band-like surface portions. The obliquely upward band-like back face portions are each formed by a smooth surface, whereas the obliquely downward band-like back face portions are each formed by a smooth, irregular or uneven surface. The obliquely downward band-like surface portions are each formed by a smooth surface which extends straight in the longitudinal section of the panel, whereas the obliquely upward band-like surface portions are each formed by a rough surface.

According to a sixth aspect of the present invention, an optical color filter has a construction wherein its surface is composed of obliquely downward band-like surface portions and obliquely upward band-like surface portions alternately arranged side by side in the vertical direction and its back face is composed of obliquely upward band-like back face portions on the opposite side from the above-mentioned obliquely downward band-like surface portions and obliquely downward band-like back face portions on the opposite side from the above-mentioned obliquely upward band-like surface portions. The obliquely upward band-like back face portions are each formed by a smooth surface which is curved convex obliquely upward and extends straight in the longitudinal section of the panel, whereas the obliquely downward band-like back face portions are each formed by a smooth, irregular or uneven surface. The obliquely downward band-like surface portions are each formed by a smooth surface which extends straight in the longitudinal section of the panel, whereas the obliquely upward band-like surface portions are each formed by a rough surface.

According to a seventh aspect of the present invention, an optical color filter has a construction wherein the obliquely upward band-like back face portions in the optical color filter according to the fifth or sixth aspect of the invention are each formed by a surface which extends straight widthwise of the panel.

According to an eighth aspect of the present invention, an optical color filter has a construction wherein the obliquely upward band-like back face portions in the optical color filter according to the fifth or sixth aspect of the invention are formed by surfaces which are each curved concave backwardly and are arranged side by side widthwise of the panel.

According to a ninth aspect of the present invention, a display element employs a plurality of pseudo-luminous panels according to the first or second aspect of the invention. The plurality of pseudo-luminous panels are arranged on a support frame so that they are selectively activated. The optical color filters of the pseudo-luminous panels have different pass bands in terms of their band-pass characteristics.

According to a tenth aspect of the present invention, a fixed matrix display employs a plurality of pseudo-luminous panels according to the first or second aspect of the invention, and they are arranged in a matrix form on a support frame.

According to twentieth aspect of the present invention, a matrix display employs a plurality of display elements, which are arranged in a matrix form on a support frame. In this instance, the display elements each have a plurality of pseudo-luminous panels according to the first or second aspect of the invention. The pseudo-luminous panels are arranged on a support frame so that they are selectively activated. The optical color filters of the pseudo-luminous panels have different pass bands in terms of their band-pass characteristics.

When the pseudo-luminous panel according to the first aspect of the present invention is disposed outdoors, for instance, high above the ground as described previously in respect of FIG. 25, sunlight directly strikes the obliquely upward band-like surface portions of the optical color filter at an angle from above but hardly strikes the obliquely downward band-like surface portions of the color filter. The sunlight directly striking the obliquely upward band-like surface portions of the color filter enter thereinto and then the obliquely upward band-like portions thereof. Since the obliquely upward band-like portions of the surface of the optical color filter are rough surfaces, the sunlight irregularly enters into the optical color filter. On the other hand, the back face of the optical color filter forms the surface of the reflecting film and, therefore, the obliquely downward band-like back face portions of the optical color filter form obliquely upward band-like surface portions of the reflecting film, which form smooth, irregular or uneven reflecting surfaces because the obliquely downward band-like back face portions of the optical color filter are smooth, irregular or uneven surfaces. On this account, the light having irregularly entered into the optical color filter is reflected by the obliquely upward band-like surface portions of the reflecting film, and the irregular reflected light passes again through the optical color filter and then its obliquely upward band-like surface portions, thereafter being emitted as scattered light from the pseudo-luminous panel.

Since the scattered light has passed through the optical color filter, it has a hue corresponding to the pass band of the color filter in terms of its band-pass characteristic. A portion of the scattered light naturally falls on the ground, and consequently, the viewer on the ground can perceive a pattern of the surface of the optical filter in the hue corresponding to its pass band.

By setting a projector on the ground and suitably selecting the position of the projector relative to the pseudo-luminous panel set up above the ground as shown in FIG. 25, the artificial light can be projected from the projector, at night, mostly onto the obliquely downward band-like surface portions of the optical color filter.

The artificial light directly striking the obliquely downward band-like surface portions of the color filter enters thereinto and then the underlying surface portions of the reflecting film. Since the obliquely downward band-like surface portions of the reflecting film are smooth reflecting surfaces, the incident light is hardly irregularly reflected but is reflected obliquely downward by the reflecting film. The reflected light passes through the color filter again and its obliquely downward surface portions and is emitted diagonally downward from the pseudo-luminous panel.

The reflected light thus emitted from the panel has passed through the optical color filter, and hence has a hue corresponding to the pass band of the color filter in terms of its band-pass characteristic. Thus the viewer on the ground can perceive the pattern of the surface of the optical color filter in the hue corresponding to its pass band.

With such a pseudo-luminous panel according to the first aspect of the present invention, the pattern of the surface of the optical color filter can be seen from the ground equally in the daytime and at night in the hue corresponding to the pass band of the color filter.

Also in this instance, the energy of the artificial light is far lower than the energy of sunlight for the same reasons given previously with respect to the conventional pseudo-luminous panel depicted in FIGS. 23 and 24, and there is a substantial difference between the energy of sunlight striking the panel in the day time and the energy of the artificial light projected onto the panel at night. However, in the daytime the viewer on the ground perceives the pattern of the surface of the optical color filter by a portion of the scattered light resulting from the irregular reflection of sunlight, whereas at night the viewer perceives the pattern mainly by the directly reflected light of the artificial light, not a portion of such scattered light.

Hence, even if the reflectivity of the reflecting film is made relatively high by a suitable selection of its material so that the pattern of the surface of the optical color filter can be clearly recognized at night, the pattern is not dazzling in the daytime and can be seen in the hue based on the pass band of the color filter. Further, even if the reflectivity of the reflecting film is made relatively low by a suitable selection of its material so that the dazzling of the pattern is reduced in the daytime, the pattern is not dark and can be seen at night as well in the hue based on the pass band of the color filter.

With the pseudo-luminous panel according to the first aspect of the present invention, the sunlight falling on the obliquely upward band-like surface portions of the optical color filter irregularly enters thereinto as referred above. In this instance, the sunlight is partly reflected by the obliquely upward band-like surface portions of the optical color filter. If the obliquely upward band-like surface portions of the optical color filter are not rough, than the partly reflected light will be directed downward obliquely to the pseudo-luminous panel. Incidentally, such partly reflected light has not passed through the optical color filter, and hence has the hue of the sunlight (i.e. a white hue), in which case the pattern of the surface of the optical color filter will be seen with a low degree of saturation and in the hue corresponding to the pass band of the optical color filter but affected by the hue of the sunlight. In the pseudo-luminous panel according to the first aspect of the present invention, however, since the obliquely upward band-like surface portions of the optical color filter are rough, the sunlight falling on them is partly reflected back as scattered light, and hence is hardly directed downward obliquely to the pseudo-luminous panel. Consequently, the pattern of the surface of the optical color filter can be displayed with a high degree of saturation and in the hue corresponding to the pass band of the color filter which is substantially free from the influence of the hue of the sunlight.

Moreover, in the case of the pseudo-luminous panel according to the first aspect of the present invention, the artificial light applied directly to the obliquely downward band-like surface portions of the optical color filter enters thereinto as mentioned above. In this case, the artificial light is partly reflected by the obliquely downward band-like surface portions of the color filter. Also in this instance, if the obliquely downward band-like surface portions of the optical color filter are not smooth, then the partly reflected light will be directed downward obliquely to the panel and it has the hue of the artificial light because it has not passed through the color filter. Hence, the pattern of the surface of the optical color filter will be seen, at night, with a low degree of saturation and in the hue corresponding to the pass band of the color filter but affected by the hue of the artificial light. According to the first aspect of the present invention however, since the obliquely downward band-like surface portions of the optical color filter are smooth surfaces which extend straight in the longitudinal section of the color filter, the pattern of the surface of the optical color filter can be displayed with a high degree of saturation and in the hue corresponding to the pass band of the color filter, substantially unaffected by the hue of the artificial light, by suitably selecting the direction of projection of the artificial light, i.e. the position of the projector so that the artificial light therefrom strikes the above-said smooth obliquely downward band-like surface portions perpendicularly thereto and is partly reflected back to the projector, not to the viewer.

Thus, the pseudo-luminous panel according to the first aspect of the present invention permits the pattern of the surface of the optical color filter to be displayed with a high degree of saturation and in the hue corresponding to the pass band of the color filter both in the daytime and at night.

The pseudo-luminous panel according to the second aspect of the present invention is identical in construction with the panel according to the first aspect of the invention, except that although the obliquely upward band-like back face portions of the optical color filter form smooth surfaces as in the case of the panel according to the first aspect of the invention, the smooth surfaces are curved convex obliquely upward. Hence, the same results as those obtainable with the pseudo-luminous panel according to the first aspect of the invention can be obtained, though not described in detail.

In the case of the pseudo-luminous panel according to the second aspect of the present invention, the obliquely upward band-like surface portions of the optical color filter are smooth surfaces which are curved convex obliquely upward in the longitudinal section of the color filter, and accordingly, the obliquely downward band-like surface portions of the reflecting film on the obliquely upward band-like back face portions of the optical color filter naturally form smooth reflecting surfaces which are curved concave obliquely upwardly. By a suitable selection of the degree and direction of convexity of the obliquely upward band-like back face portions of the optical color filter, a reflected version of the artificial light by the obliquely downward band-like surface portions of the reflecting film can be emitted to the outside of the panel downward obliquely thereto through only the obliquely downward band-like surface portions of the color filter, without passage through its obliquely upward band-like rough surface portions. In addition, reflected light thus emitted diagonally downward from the panel is permitted to spread over a wide angular range in the vertical direction. This prevents that the reflected version of the artificial light from the obliquely downward band-like surface portions of the reflecting film passes through the obliquely upward band-like surface portions of the optical color filter and is emitted as scattered light from the panel and the scattered light is partly directed downward obliquely thereto, and that reflected version of the artificial light from the obliquely downward band-like surface portions of the reflected film is emitted from the panel obliquely downward but does not spread over a wide angular range.

Thus, the pseudo-luminous panel according to the second aspect of the present invention allows the pattern of the surface of the optical color filter to be seen at night with a high degree of lightness and in the hue corresponding to the pass band of the optical color filter from the ground over a wide positional range in front of the panel.

The pseudo-luminous panel according to the third aspect of the invention is identical in construction with the panel according to the first or second aspect of the invention except that the obliquely upward band-like back face portions of the optical color filter are surfaces which extend straight widthwise of the color filter, the obliquely downward band-like surface portions of the reflecting film, formed by the obliquely upward band-like back face portions of the color filter, are naturally reflecting surfaces which extend straight widthwise of the reflecting film. It is therefore possible, with this panel, to obtain the same result as those obtainable with the panel according to the first or second aspect of the invention. Moreover, reflected artificial light emitted diagonally downward from the pseudo-luminous panel does not unnecessarily scatter in the lateral direction. This structure allows the pattern of the surface of the optical color filter to be distinctly seen at night from positions within a certain area limited in the lateral direction relative to the panel.

The pseudo-luminous panel according to the fourth aspect of the present invention is identical in construction with the panel according to the first or second aspect of the invention except that since the obliquely upward band-like back face portions of the optical color filter are each curved convex and are arranged side by side widthwise of the color filter, the corresponding obliquely downward band-like surface portions of the reflecting film, formed on the obliquely upward band-like back face portions of the color filter, are surfaces which are each curved concave obliquely downward and are arranged side by side widthwise of the panel. It is therefore possible, with this panel, to obtain the same results as those obtainable with the panel according to the first or second aspect of the invention. Moreover, reflected artificial light emitted diagonally downward from the pseudo-luminous panel spread in the lateral direction. This structure allows the pattern of the surface of the optical color filter to be distinctly seen at night from positions almost everywhere in the lateral direction relative to the panel.

With the optical color filter according to the fifth aspect of the present invention, the pseudo-luminous panel according to the first aspect of the invention which produces the afore-mentioned excellent effects can easily be obtained simply by forming the reverse side the optical color filter with the reflecting film in the panel according to the first aspect of the invention.

With the optical color filter according to the sixth aspect of the present invention, the pseudo-luminous panel according to the second aspect of the invention which produces the afore-mentioned excellent effects can easily be obtained simply by forming the reverse side of the optical color filter with the reflecting film in the panel according to the second aspect of the invention.

With the optical color filter according to the seventh aspect of the present invention, the pseudo-luminous panel according to the third aspect of the invention which produces the afore-mentioned excellent effects can easily be obtained simply by forming the reverse side of the optical color filter with the reflecting film in the pseudo-luminous panel according to the first or third aspect of the invention.

With the optical color filter according to the eighth aspect of the present invention, the pseudo-luminous panel according to the fourth aspect of the invention which produces the afore-mentioned excellent effects simply by forming the reverse side of optical color filter with the reflecting film in the pseudo-luminous panel according to the fourth aspect of the invention.

With the display element according to the ninth aspect of the present invention, it is possible to provide displays in different hues based on different pass bands of the respective optical color filters while at the same time producing the excellent effects described previously in respect of the first or second aspect of the invention.

With the fixed matrix display device according to the tenth aspect of the present invention, it is possible to display characters, figures and other patterns in a desired hue while at the same time producing the excellent effects described previously in respect of the first or second aspect of the invention.

With the matrix display device according to the eleventh aspect of the present invention, it is possible to display characters, figures and other patterns selected as desired, in a desired hue while at the same time producing the excellent effects described previously in respect of the first or second aspect of the invention.

BRIEF DESCRIPTION OF THE DRAWINGS

FIG. 1 is a longitudinal-sectional view schematically illustrating a first embodiment of the pseudo-luminous panel according to the present invention;

FIG. 2 is a front view, partly cut away, showing the first embodiment of the pseudo-luminous panel according to the present invention;

FIG. 4 is a longitudinal-sectional view schematically illustrating a second embodiment of the pseudo-luminous panel according to the present invention;

FIG. 5 is a front view, partly cut away, schematically showing the second embodiment of the present invention;

FIG. 6 is a longitudinal-sectional view schematically illustrating a third embodiment of the pseudo-luminous panel according to the present invention;

FIG. 7 is a schematic front view, partly cut away, showing the third embodiment of the present invention;

FIG. 8 is a schematic diagram for explaining the third embodiment depicted in FIGS. 6 and 7;

FIG. 9 is a longitudinal-sectional view schematically illustrating a fourth embodiment of the pseudo-luminous panel according to the present invention;

FIG. 10 is a schematic front view, partly out away, showing the fourth embodiment of the present invention;

FIG. 11 is a longitudinal-sectional view schematically illustrating a first embodiment of the optical color filter for the pseudo-luminous panel according to the present invention;

FIG. 12 is a schematic front view, partly cut away, showing the first embodiment of the optical color filter;

FIG. 13 is a longitudinal-sectional view schematically illustrating a second embodiment of the optical color filter for the pseudo-luminous panel according to the present invention;

FIG. 14 is a schematic front view, partly cut away, showing the second embodiment of the optical color filter;

FIG. 15 is a longitudinal-sectional view schematically illustrating a third embodiment of the optical color filter for the pseudo-luminous panel according to the present invention;

FIG. 16 is a schematic front view, partly cut away, showing the third embodiment of the optical color filter;

FIG. 23 is a longitudinal-sectional view schematically illustrating a conventional pseudo-luminous panel;

FIG. 24 is a schematic front view showing the conventional pseudo-luminous panel.

DESCRIPTION OF THE PREFERRED EMBODIMENTS

Embodiment 1

Figure 3:
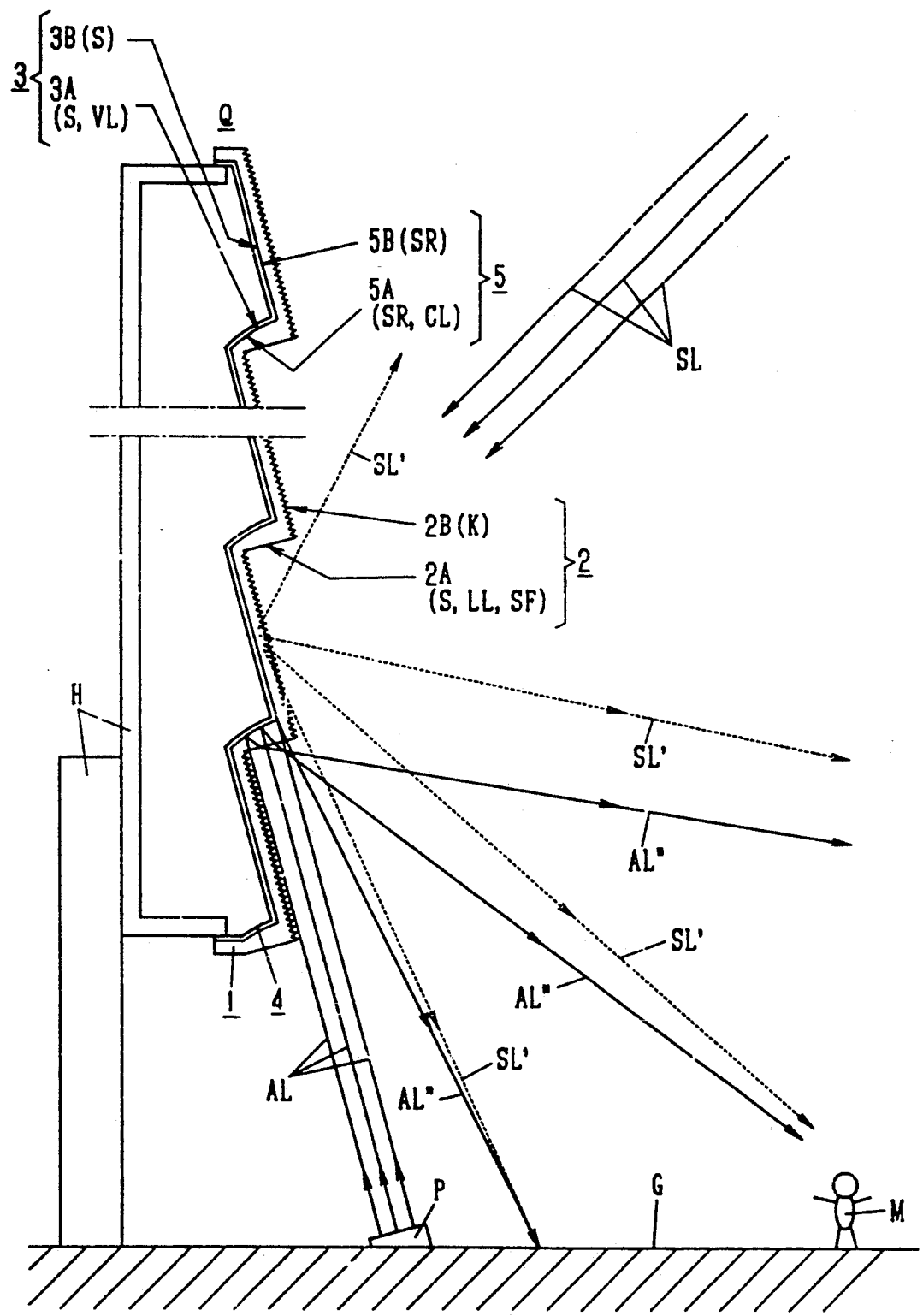
FIG. 3 is a schematic diagram for explaining the first embodiment depicted in FIGS. 1 and 2.

Referring now to FIGS. 1 and 2, a first embodiment of the pseudo-luminous panel, identified generally by Q, according to the present invention will be described, which comprises an optical color filter 1 and a reflecting film 4 formed all over the back 3 thereof.

The surface 2 of the optical color filter 1 includes obliquely downward and upward band-like surface portions 2A and 2B which are alternately arranged side by side in the vertical direction. The obliquely downward band-like surface portions 2A are each formed by a smooth reflecting surfaces which is a smooth surface LL extending straight in the longitudinal section of the panel Q and extending straight widthwise or in the lateral section of the panel Q. Therefor, the obliquely downward band-like surface portions 2A are each formed by flat plane surface SF. The obliquely upward band-like surface portions 2B are each formed by a rough surface K which extends in a flat plane.

The back face 3 of the optical color filter 1 is composed of obliquely upward band-like back face portions 3A on the opposite side from the obliquely downward band-like surface portions 2A forming the surface 2 of the color filter 1 and obliquely downward band-like back face portions 3B on the opposite side from the obliquely upward band-like surface portions 2B similarly forming the surface 2 of the color filter 1. The obliquely upward band-like back face portions 3A forming the back face 3 of the color filter 1 are each formed by a smooth surface S which is curved convex obliquely upward in the longitudinal section of the panel Q and extends straight widthwise of the panel Q, as indicated by VL. The obliquely downward band-like back face portions 3B of the color filter 1 are each a smooth surface S which extends straight in a plane.

Moreover, the back face 3 of the optical color filter 1 forms the surface 5 of the reflecting film 4. Accordingly, obliquely downward band-like surface portions 5A of the reflecting film 4, formed by the obliquely upward band-like back face portions 3A of the optical color filter 1, are each a smooth reflecting surface SR, which is curved convex obliquely downward in the longitudinal section of the panel Q and extends straight width-wise of the panel Q, as indicated by CL. On the other hand, obliquely upward bank-like surface portions 5B of the reflecting film 4, formed by the obliquely downward band-like back face portions 3B of the optical color filter 1, are smooth reflecting surfaces SR each extending in a plane.

In the case where the pseudo-luminous panel Q of the above construction is disposed outdoors, for example, high above ground G and in such a manner that the surface 2 of the color filter 1 extends in the vertical plane, by use a support H as shown in FIG. 3, sunlight SL directly strikes the obliquely upward band-like surface portions 2B of the color filter 1 but hardly falls on the obliquely downward band-like surface portions 2A of the color filter 3. In this case, the sunlight SL enters into the optical color filter 1 through its the obliquely upward band-like surface portions 2B. Since the surface portions 2B are each formed by the rough surface K, the sunlight SL incident to them irregularly enters into the optical color filter 1. On the other hand, the obliquely downward band-like back face portions 3B of the optical color filter 1 form the obliquely upward band-like surface portions 5B of the reflecting film 4, and the obliquely upward band-like surface portions 5B are smooth reflecting surface SR, since the obliquely downward band-like back face portions 3B are smooth surfaces S. Hence, the light having irregularly entered into the optical color filter 1 is reflected by the surface portions 5B of the reflecting film 4 and the reflected light passes again through the optical color filter 1 and its obliquely upward band-like surface portions 2B and is then emitted as scattered light SL' from the pseudo-luminous panel Q.

The scattered light SL' has passed through the film optical color filter 1, and hence has a hue based on the pass band of the color filter 1 in terms of its band-pass characteristic. A portion of the scattered light SL' is directed toward the ground G. Consequently, in the daytime a pattern of the main surface 2 of the optical color filter 1 can be seen by the viewer M from the ground G in the hue based on the pass band of the color filter 1.

By setting a projector P on the ground G and suitably selecting the position of the projector P relative to the pseudo-luminous panel Q for illumination with the artificial light AL at night, the artificial light AL mostly strikes the obliquely downward band-like surface portions 2A of the optical color filter 1. The artificial light AL striking the surface portions 2A enters therethrough into the optical color filter 1 and then into the obliquely downward band-like surface portions 5A of the reflecting film 4. In this instance, since the obliquely downward band-like back face portions 3A of the optical color filter 1 are smooth, the obliquely downward band-like surface portions 5A of the reflecting film 4, formed by the obliquely upward band-like back face portions 3B, are smooth surfaces SR. Hence, the incident light AL to the obliquely downward band-like surface portions 5A of the reflecting film 4 hardly undergoes irregular reflection therein and is reflected intact therefrom. Thus reflected light passes again through the color filter 1 and its obliquely downward band-like surface portions 2A and is emitted obliquely downward as directly reflected light AL" from the pseudo-luminous panel Q.

The reflected light AL" thus emitted diagonally below the panel Q has passed through the optical color filter 1, and hence has a hue based on the pass band or band-pass characteristic of the color filter 1. Hence, a pattern of the surface 2 of the color filter 1 can be seen by the viewer M at night from a position diagonally below the panel Q in the hue based on the pass band or band-pass characteristic of the color filter 1.

Thus, according to the pseudo-luminous panel Q of the present invention depicted in FIGS. 1 and 2, when it is disposed high above the ground G so that it is irradiated by the sunlight SL in the daytime and by the artificial light AL at night, as in the case of the conventional pseudo-luminous panel described previously in respect of FIGS. 23 and 24, the pattern of the surface 2 of the color filter 1 can always be seen from the position diagonally below the panel Q in the hue based on the band-pass characteristic or pass band of the color filter 1.

As referred to previously, there is a great difference in energy between the sunlight SL and the artificial light AL which strike the pseudo-luminous panel Q. In the daytime the viewer M perceives the pattern of the surface 2 of the color filter 1 by a portion of the scattered light SL', whereas at night he sees the pattern by the directly or regularly reflected light AL".

On this account, when the reflectivity of the reflecting film 4 is made relatively high by a suitable selection of its material so that the pattern of the surface 2 of the color filter 1 can be seen distinctly at night, the pattern in the day time does not become dazzling and can be seen clearly in the hue based on the band-pass characteristic or pass band of the thin film optical color filter 1. Also when the reflectivity of the reflecting film 4 is made low by a suitable selection of its material so that the pattern of the surface 2 of the color filter 1 is not dazzling in the daytime, the pattern can clearly be seen at night in the hue based on the band-pass characteristic or pass band of the color filter 3.

Furthermore, the obliquely downward band-like back face portions 3A forming the back face 3 of the optical color filter 1 are each formed by the smooth reflecting surface S, which is the surface VL curved convex obliquely upward in the longitudinal section of the panel Q and extends straight widthwise of the panel Q, as mentioned previously, and accordingly, the obliquely downward band-like surface portions 5A of the reflecting film 4 are each smooth surface SR, which is the surface CL curved concave obliquely downward in the longitudinal section of the panel Q and extends straight widthwise of the panel Q. With such a structure, the reflected light AL" emerging from the panel Q does not unnecessarily spread wide in the lateral direction, and consequently, the area diagonally to the front of the panel Q where the pattern of the main surface 2 of the substrate 1 can be seen is limited to some extent, but the pattern can be viewed distinctly from such a modestly limited area.

With the pseudo-luminous panel Q of the present invention shown in FIGS. 1 and 2, the sunlight SL falling on the obliquely upward band-like surface portions 2B of the optical color filter 1 irregularly enters thereinto as referred above. In this instance, the sunlight SL is partly reflected by the obliquely upward band-like surface portions 2B of the optical color filter 1. If the obliquely upward band-like surface portions 2B of the optical color filter 1 are not rough, the partly reflected light will be directed downward obliquely to the pseudo-luminous panel Q. Incidentally, such partly reflected light has not passed through the optical color filter 1, and hence has the hue of the sunlight SL (i.e. a white hue), in which case the pattern of the surface 2 of the optical color filter 1 will be seen with a low degree of saturation and in the hue corresponding to the pass band of the optical color filter 1 but affected by the hue of the sunlight SL. In the pseudo-luminous panel Q according to the present invention shown in FIGS. 1 and 2, however, since the obliquely upward band-like surface portions 2B of the optical color filter 1 are rough surfaces K, the sunlight SL falling on them is partly reflected back as scattered light, and hence is hardly directed downward obliquely to the pseudo-luminous panel Q. Consequently, the pattern of the surface 2 of the optical color filter 1 can be displayed with a high degree of saturation and in the hue corresponding to the pass band of the color filter 1 which is substantially free from the influence of the hue of the sunlight SL.

Moreover, in the case of the pseudo-luminous panel Q shown in FIGS. 1 and 2, the artificial light AL applied directly to the obliquely downward band-like surface portions 2A of the optical color filter 1 enters thereinto as mentioned above. In this case, the artificial light AL is partly reflected by the obliquely downward band-like surface portions 2A of the color filter 1. Also in this instance, if the obliquely downward band-like surface portions 2A of the optical color filter 1 are not smooth, the partly reflected light will be directed downward obliquely to the panel Q and it has the hue of the artificial light AL because it has not passed through the color filter 1. Hence, the pattern of the surface 2 of the optical color filter 1 will be seen, at night, with a low degree of saturation and in the hue corresponding to the pass band of the color filter but affected by the hue of the artificial light AL. According to the present invention, however, since the obliquely downward band-like surface portions 2A of the optical color filter 1 are smooth surfaces S which extend straight in the longitudinal section and in the lateral section of the panel Q, the pattern of the surface 2 of the optical color filter 1 can be displayed with a high degree of saturation and in the hue corresponding to the pass band of the color filter 1, substantially unaffected by the hue of the artificial light AL, by suitably selecting the direction of projection of the artificial light AL, i.e. the position of the projector P so that the artificial light AL therefrom strikes the above-said smooth obliquely downward band-like surface portions 2A perpendicularly thereto and is partly reflected back to the projector P, not to the viewer M.

Thus, the pseudo-luminous panel Q of this embodiment permits the pattern of the surface 2 of the optical color filter 1 to be displayed with a high degree of saturation and in the hue corresponding to the pass band of the color filter 1 both in the daytime and at night.

Furthermore, in the case of the pseudo-luminous panel Q of this embodiment, the obliquely upward band-like back face portions 3A of the optical color filter 1 are smooth surfaces S which are surfaces VL curved convex obliquely upward in the longitudinal section of the panel Q and extending straight widthwise of the panel Q, and accordingly, the obliquely downward band-like surface portions 5A of the reflecting film 4 on the obliquely upward band-like back face portions 3A of the optical color filter 1 naturally form smooth reflecting surfaces SR which are surfaces CL curved concave obliquely upward in the longitudinal section of the panel Q and extending straight widthwise of the panel Q. By a suitable selection of the degree and direction of convexity of the obliquely upward band-like back face portions 3A of the optical color filter 1, a reflected version of the artificial light AL by the obliquely downward band-like surface portions 5A of the reflecting film 4 can be emitted to the outside of the panel Q downward obliquely thereto through only the obliquely downward band-like surface portions 2A of the color filter 1, without passage through its obliquely upward band-like rough surface portions 2B. In addition, reflected light thus emitted diagonally downward from the panel Q is permitted to spread over a wide angular range in the vertical direction. This prevents that the reflected version of the artificial light AL from the obliquely downward band-like surface portions 5A of the reflecting film 4 passes through the obliquely upward band-like surface portions 2B of the optical color filter 1 and is emitted as scattered light from the panel Q and the scattered light is partly directed downward obliquely thereto, and that reflected version of the artificial light AL from the obliquely downward band-like surface portions 5A of the reflected film 4 is emitted from the panel Q obliquely downward but does not spread over a wide angular range.

Thus, the pseudo-luminous panel Q of this embodiment allows the pattern of the surface 2 of the optical color filter 1 to be seen at night with a high degree of lightness and in the hue corresponding to the pass band of the optical color filter 1 from the ground G over a wide positional range in front of the panel Q.

Embodiment 2

Turning next to FIGS. 4 and 5, a second embodiment of the pseudo-luminous panel Q according to the present invention will be described. The parts corresponding to those in FIGS. 1 and 2 are identified by the same reference numerals and no detailed description thereof will be repeated.

The pseudo-luminous panel Q of this example is identical in construction with the first embodiment shown in FIGS. 1 and 2 except that in the former the obliquely downward band-like back face portions 3B of the optical color filter 1 are each formed by an irregular or uneven surface D or U extending in the flat plane, and hence the obliquely upward band-like surface portions 5B of the reflecting film 4 are irregular or uneven reflecting surfaces DR or UR.

With the pseudo-luminous panel Q of such a structure, it is possible to obtain the same results as those obtainable with the first embodiment described above in respect of FIGS. 1 and 2.

In this embodiment, however, since the obliquely upward band-like surface portions 5B of the reflecting film 4 are each formed by the irregular or uneven surface D or UR, the sunlight SL incident on the color filter 1 irregularly enters thereinto and is irregularly reflected by the obliquely upward band-like surface portions 5B of the reflecting film 4 back to the front of the panel Q through the color filter 1, thereafter being irregularly emitted from the panel Q. Therefor, the scattered light SL' is more scattered than in the case of the first embodiment of FIGS. 1 and 2.

Hence, even if in the case of the panel Q of the first embodiment the pattern of the optical color filter 1 is dazzling owing to relatively high intensity of the sunlight SL in the daytime, it is possible, with the panel Q of this embodiment, to provide a non-glare display of the pattern in the hue based on the band-pass characteristic or pass band of the color filter 1.

Embodiment 3

Referring now to FIGS. 6 and 7, a third embodiment of the pseudo-luminous panel Q according to the present invention will be described. The parts corresponding to those in FIGS. 1 and 2 are identified by the same reference numerals and no detailed description thereon will be repeated.

The pseudo-luminous panel Q of this embodiment is identical in construction with the first embodiment of FIGS. 1 and 2 except in the following points. In this embodiment, the obliquely upward band-like back face portions 3A of the optical color filter 1 are smooth surfaces S which are surfaces VC curved convex obliquely upward in the longitudinal section of the panel Q and repeatedly curved concave backward in the cross-section of the panel Q; accordingly, the obliquely downward band-like surface portions 5A of the reflecting film 4 are smooth reflecting surfaces SR which are surface CV curved concave obliquely downward in the longitudinal section of the panel Q and repeatedly convex forward in the cross-section of the panel Q; and accordingly, the obliquely downward band-like surface portions 2A of the optical color filter 1 are each smooth surface S which is surface LV extending straight in the longitudinal section of the panel Q and repeatedly protrudes forward in the cross-section of the panel Q.

It is evident that the pseudo-luminous panel Q of this embodiment produces the same effects as those obtainable with the embodiment shown in FIGS. 1 and 2, though not described in detail.

In this embodiment, since the obliquely downward band-like surface portions 5A forming the surface 5 of the reflecting film 4 are each the smooth surface SR which is concave downward in the longitudinal section of the panel Q and repeatedly protrudes forward in the cross-section of the panel Q, as indicated by CV, the reflected light AL" emerging forwardly downward from the panel Q spreads to the right and left, i.e. in the lateral or widthwise direction of the panel Q, as shown in FIG. 8. By properly selecting the concavities of each protruded surface curvature of the surface VC, it is possible to essentially lift restrictions on the area from which the pattern of the main surface 2 of the substrate 1 can be seen in the lateral direction relative to the panel Q.

Embodiment 4

With reference to FIGS. 9 and 10, a fourth embodiment of the pseudo-luminous panel Q according to the present invention will be described. The parts corresponding to those in FIGS. 6 and 7 are identified by the same reference numerals and no detailed description will be given of them.

The pseudo-luminous panel Q of this embodiment is identical in construction with the panel Q of the third embodiment shown in FIGS. 6 and 7 except that in the former the obliquely upward band-like back face portions 3B of the optical color filter 1 are each formed by the irregular or uneven surface D or U as in the case of the second embodiment described above in respect of FIGS. 4 and 5, and hence the obliquely upward surface portions 5B of the reflecting film 4 are each the irregular or uneven reflecting surface DR or UR which extends in the flat plane.

It is evident that the pseudo-luminous panel Q of this embodiment produces the same effects as those obtainable with the panels Q of the second and third embodiments described previously in connection with FIGS. 4 and 5 and 6 and 7, respectively.

Embodiment 5

Turning next to FIGS. 11 and 12, a first embodiment of the optical color filter for the pseudo-luminous panel according to the present invention will be described. The parts corresponding to those in FIGS. 1 and 2 are identified by the same reference numerals and no detailed description will be given thereof.

The optical color filter indicated generally by B in FIGS. 11 and 12, is identical in construction with the color filter 1 of the first embodiment of FIGS. 1 and 2 except that the reflecting film 4 in the latter is omitted.

Hence, the pseudo-luminous panel Q of the present invention, described previously in conjunction with FIGS. 1 and 2, can be obtained simply by forming its reflecting film 4 all over the back face 3 of the optical color filter 1.

Accordingly, the use of the optical color filter B shown in FIGS. 11 and 12 will allow easy fabrication of the pseudo-luminous panel Q of the present invention which has the excellent effects described previously with respect to FIGS. 1 and 2.

Embodiment 6

Referring next to FIGS. 13 and 14, a second embodiment of the optical color filter B for the pseudo-luminous panel Q according to the present invention will be described. The parts corresponding to those in FIGS. 4 and 5 are identified by the same reference numerals and no detailed description will be given thereof.

The optical color filter B of this embodiment is identical in construction with the color filter 1 of the second embodiment of the pseudo-luminous panel Q shown in FIGS. 4 and 5 except that the reflecting film 4 in the latter is omitted.

Hence, the pseudo-luminous panel Q of the present invention, described previously in conjunction with FIGS. 4 and 5, can be obtained simply by forming its reflecting film 4 all over the back face 3 of the optical color filter 1.

Accordingly, the use of the optical color filter B shown in FIGS. 13 and 14 will allow easy fabrication of the pseudo-luminous panel Q of the present invention which has the excellent effects described previously with respect to FIGS. 4 and 5.

Embodiment 7

Referring next to FIGS. 15 and 16, a third embodiment of the optical color filter B for the pseudo-luminous panel Q according to the present invention will be described. The parts corresponding to those in FIGS. 6 and 7 are identified by the same reference numerals and no detailed description will be given thereof.

The optical color filter B of this embodiment is identical in construction with the color filter 1 of the third embodiment of the pseudo-luminous panel Q shown in FIGS. 6 and 7 except that the reflecting film 4 in the latter is omitted.

Hence, the pseudo-luminous panel Q of the present invention, described previously in conjunction with FIGS. 6 and 7, can be obtained simply by forming its reflecting film 4 all over the back face 3 of the optical color filter 1. Accordingly, the use of the optical color filter B shown in FIGS. 15 and 16 will allow easy fabrication of the pseudo-luminous panel Q of the present invention which has the excellent effects described previously with respect to FIGS. 6 and 7.

Embodiment 8

Figure 18:
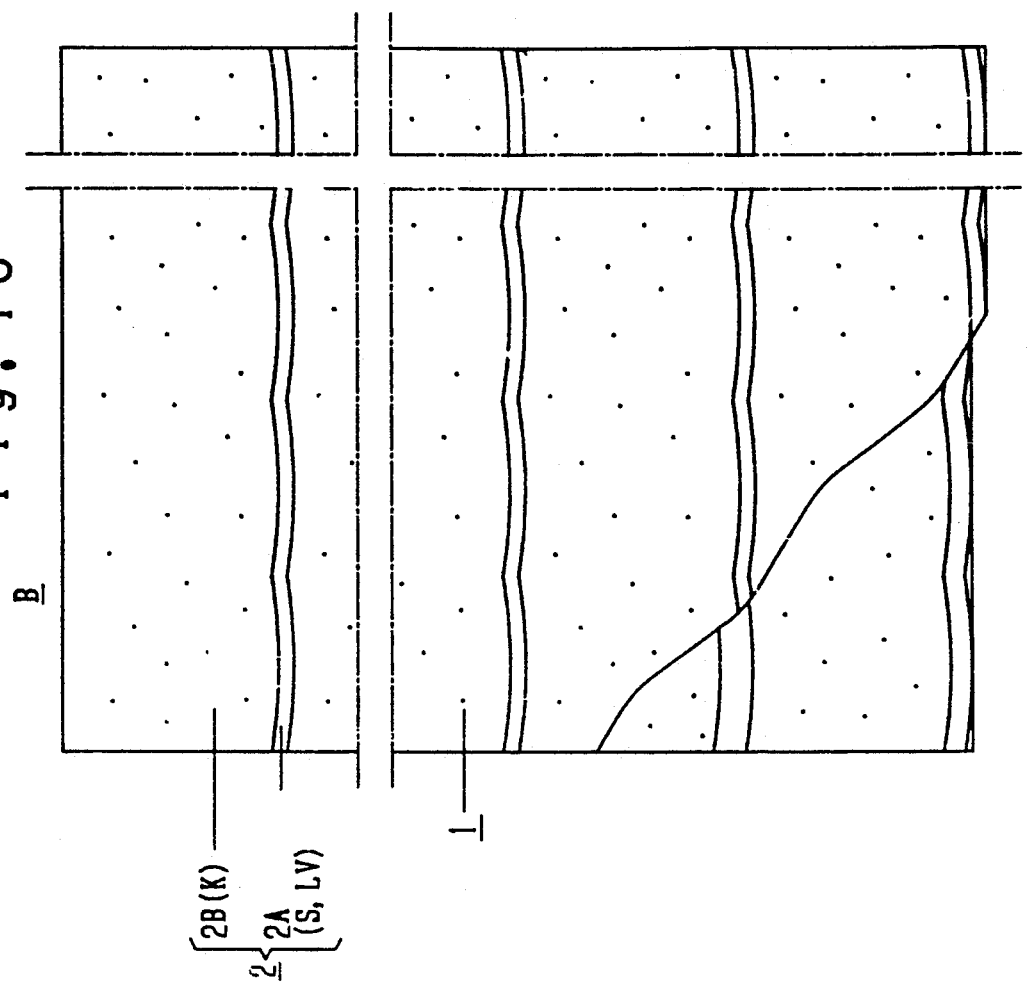
FIG. 18 is a schematic front view, partly cut away, showing the fourth embodiment of the optical color filter.
Figure 17:
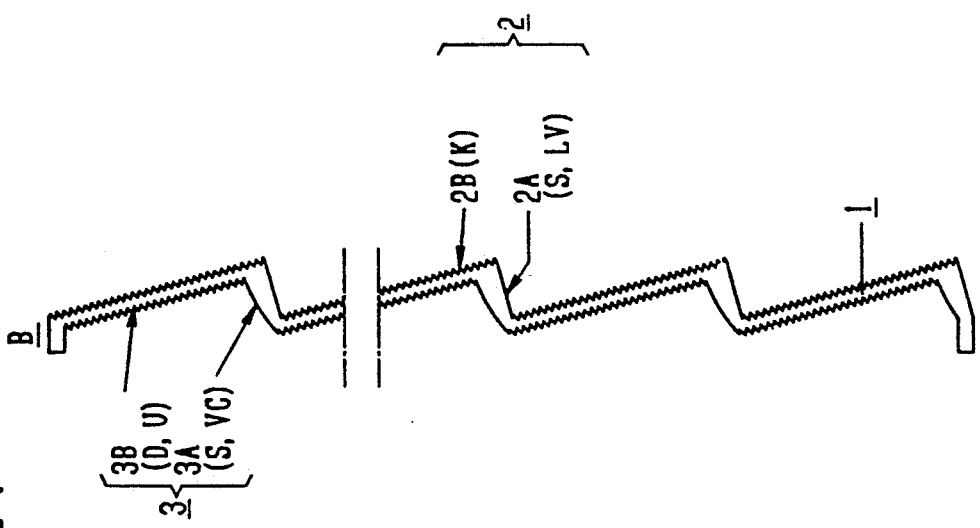
FIG. 17 is a longitudinal-sectional view schematically illustrating a fourth embodiment of the optical color filter for the pseudo-luminous panel according to the present invention.

Referring next to FIGS. 17 and 18, a fourth embodiment of the optical color filter B for the pseudo-luminous panel Q according to the present invention will be described. The parts corresponding to those in FIGS. 9 and 10 are identified by the same reference numerals and no detailed description will be given thereof.

The optical color filter B of this embodiment is identical in construction with the color filter 1 of the sixth embodiment of the pseudo-luminous panel Q shown in FIGS. 9 and 10 except that the reflecting film 4 in the latter is omitted.

Hence, the pseudo-luminous panel Q of the present invention, described previously in conjunction with FIGS. 9 and 10, can be obtained simply by forming its reflecting film 4 all over the back face 3 of the optical color filter 1.

Accordingly, the use of the optical color filter B shown in FIGS. 17 and 18 will allow easy fabrication of the pseudo-luminous panel Q of the present invention which has the excellent effects described previously with respect to FIGS. 9 and 10.

Embodiment 9

Figure 19:
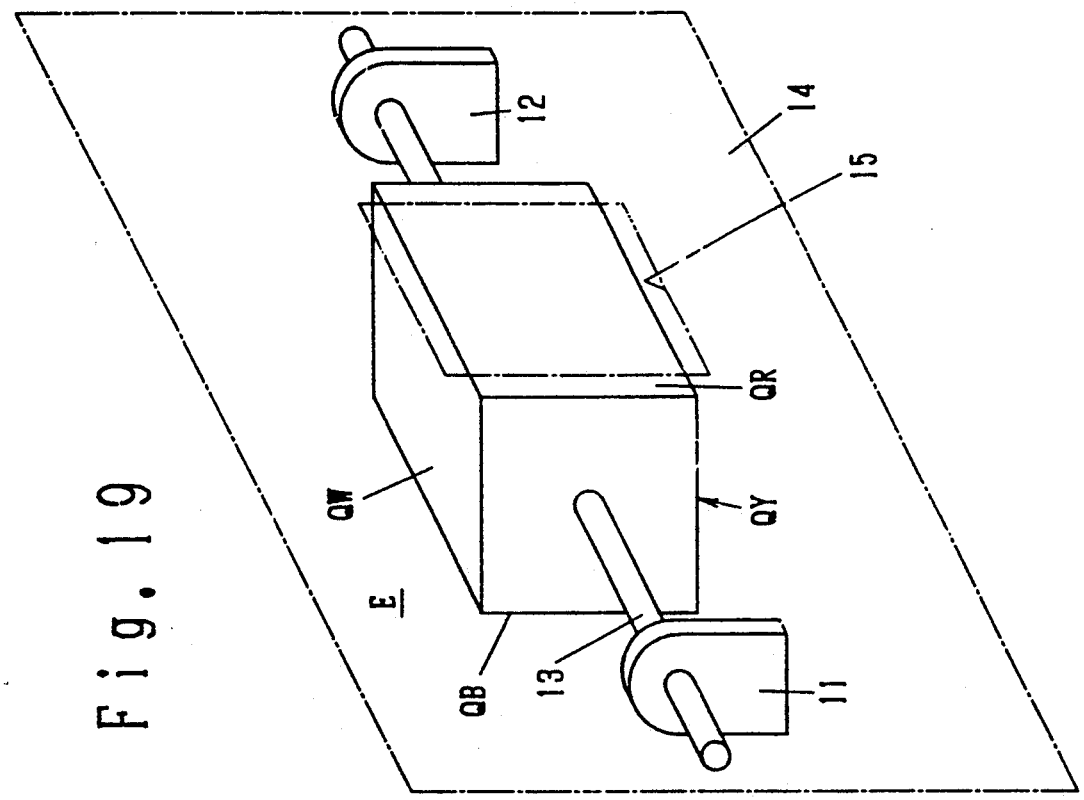
FIG. 19 is a perspective view schematically illustrating a first embodiment of a display element using the pseudo-luminous panel according to the present invention.

Turning next to FIG. 19, a first embodiment of the display element employing the pseudo-luminous panels of the present invention will be described.

The display element, denoted generally by E in FIG. 19 as a construction in which four pseudo-luminous panels QR, QY, QB and QW of any one of the first to fourth embodiments described above are disposed at 90 degrees angular intervals about rotary shaft 13 pivotally supported at both ends by bearings 11 and 12 in such a manner as to turn by steps of 90 degrees in a forward or backward direction. In this instance, optical color filters 1 of the pseudo-luminous panels QR, QY, QB and QW have difference pass bands in terms of their band-pass characteristics so that patterns on the color filters 1 are seen in different hues, for example, red, yellow, blue and white.

In this embodiment a style strip 14 having a window 15 is disposed in front of the display element E and the rotary shaft 13 is turned by suitable means by steps of 90 degrees in the forward or backward direction to selectively bring one of the pseudo-luminous panels QR, QY, QB and QW to the front just behind the window 15.

When such a display element E, combined with the style strip 14, is disposed outdoors, for example, high above the ground in the same manner as described previously in connection with the pseudo-luminous panels Q of the first to fourth embodiment, the pattern of the selected one of the pseudo-luminous panels QR, QY, QB and QW which has been brought to the front can be viewed through the window 15 in the hue based on the pass band of the color filter 3 of the selected pseudo-luminous panel (for example, red, yellow, blue or white) in the daytime and at night. In this instance, the excellent effects described previously in respect of the first to fourth embodiment are produced.

Hence, the display element E of this embodiment is capable of displaying patterns in different colors, as desired. Accordingly, the display element E can be applied to a traffic signal display, for example.

Embodiment 10

Figure 20:
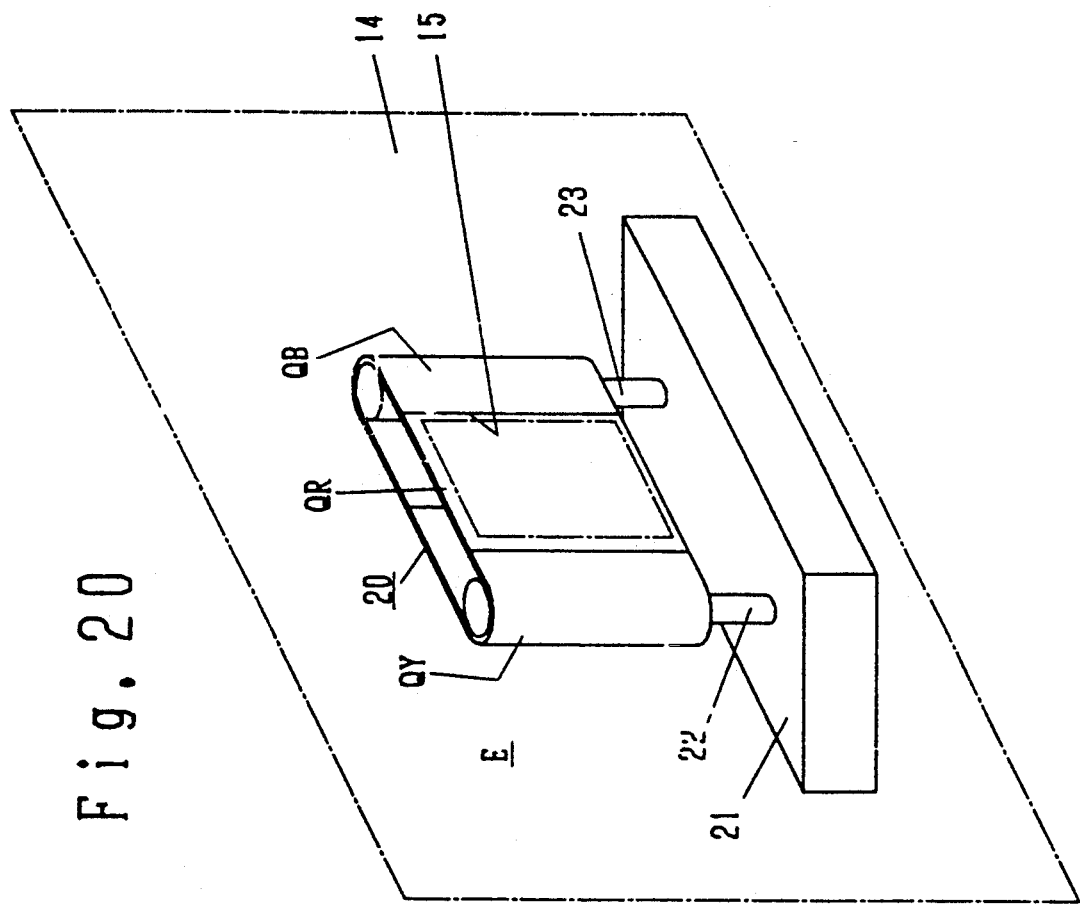
FIG. 20 is a schematic perspective view showing a second embodiment of the display element.

Turning next to FIG. 20, a second embodiment of the display element according to the present invention will be described.

The display element E of this embodiment has a construction in which three flexible pseudo-luminous panels QR, QY and QB according to any one of the aforementioned first to fourth embodiments of the present invention are sequentially arranged on an endless belt 20 or sequentially arranged to form such an endless belt 20 and belt 20 is stretched between rotary shafts 22 and 23 planted on a support 21.

In this instance, the optical color filters 1 of the pseudo-luminous panels QR, QY and QB have different pass bands so that their patterns are viewed in different colors, for example, red, yellow and blue as in the first embodiment of the display element.

The style strip 14 having the window 15 is disposed in front of the display element E, and by turning the rotary shafts 22 and 23 in the forward or backward direction by suitable means, the pseudo-luminous panels QR, QY and QB can be selectively brought to the front for display through the window 15.

When the display element E of this embodiment is disposed outdoors, for example, high above the ground and the style strip 14 is placed in front of the display element E as mentioned above, the pattern of that selected one of the pseudo-luminous panels QR, QY and QB which has been brought to the front can be viewed through the window 15 in the hue based on the pass band of the color filter 1 of the selected pseudo-luminous panel (for example, red, yellow or blue) in the daytime and at night.

Thus, the display element E of this embodiment is also capable of displaying patterns in different colors and, at the same time, produces the excellent effects described previously in respect of the first to fourth embodiments of the present invention.

Accordingly, the display element E of this embodiment is also applicable to a traffic signal display, for instance.

Embodiment 11

Figure 21:
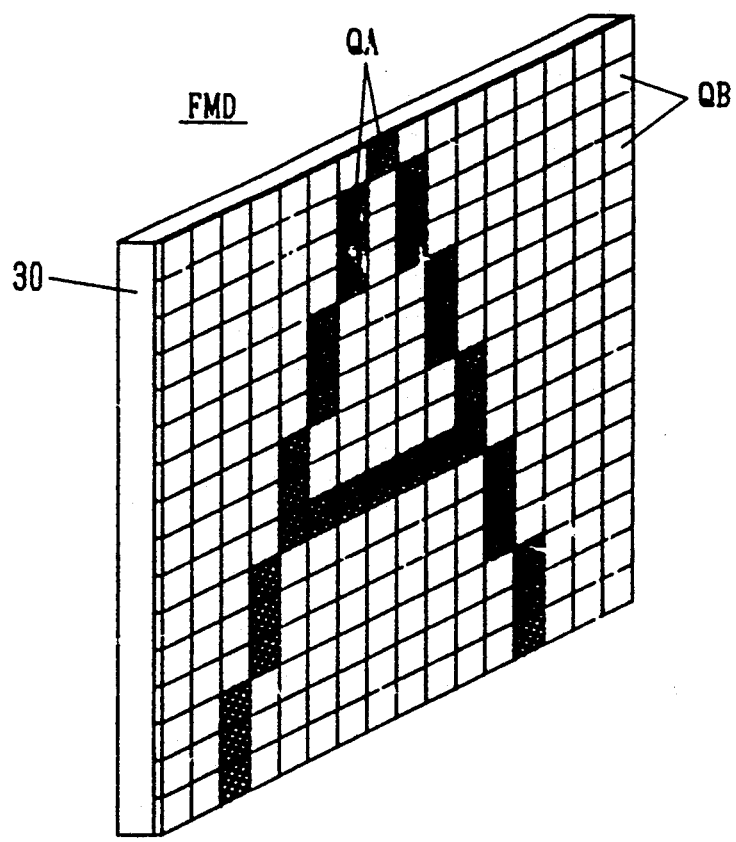
FIG. 21 is a perspective view schematically illustrating an embodiment of the fixed matrix display using the pseudo-luminous panel according to the present invention.

Turning next to FIG. 21, an embodiment of the fixed matrix display device employing the pseudo-luminous panels according to the present invention.

The fixed matrix display device, denoted generally by FMD in FIG. 21, has a construction in which a number of pseudo-luminous panels Q according to any one of the first to fourth embodiments are arranged in a matrix form. In this instance, optical color filters 1 of the pseudo-luminous panels (indicated by QB) except those QA each have a pass band in its band-pass characteristic for blue color, for example, and film optical color filters of the other pseudo-luminous panels QA each have a pass band in its band-pass characteristic for red color, for instance. The pseudo-luminous panels Q are arranged so that the pseudo-luminous panels QA form a pattern of a character, for example, "A".

When such a fixed matrix display device FMD is installed outdoors, for example, high above the ground, the pattern of the character "A" can be displayed in the hue (red) based on the pass band of the color filter 3 of each pseudo-luminous panel QA in the daytime and at night.

Thus, the fixed matrix display device FMD of this embodiment can be employed for advertisement, for instance.

Embodiment 12

Figure 22:
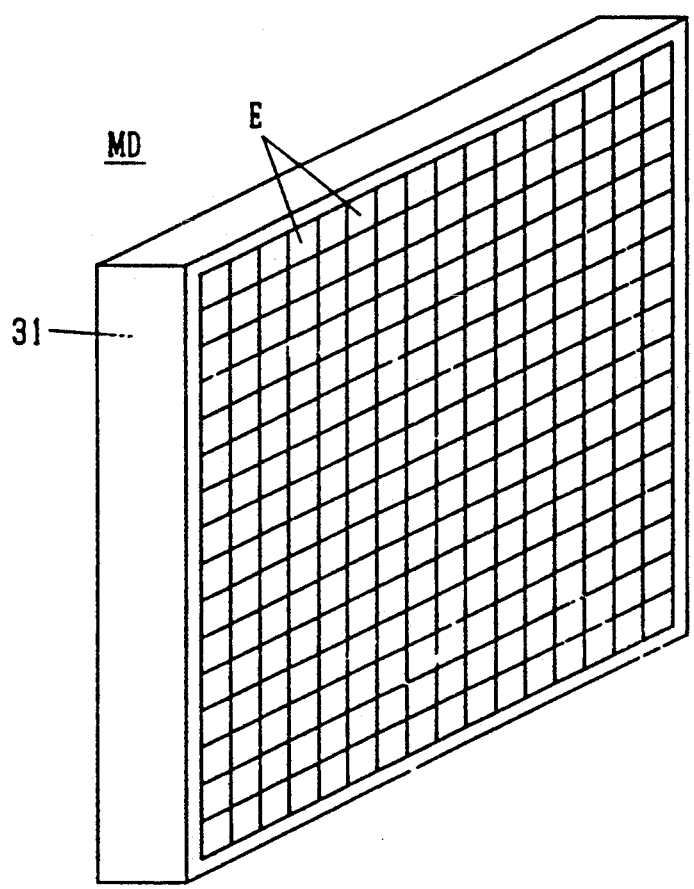
FIG. 22 is a perspective view schematically illustrating an embodiment of a matrix display using the pseudo-luminous panel according to the present invention.
Figure 25:
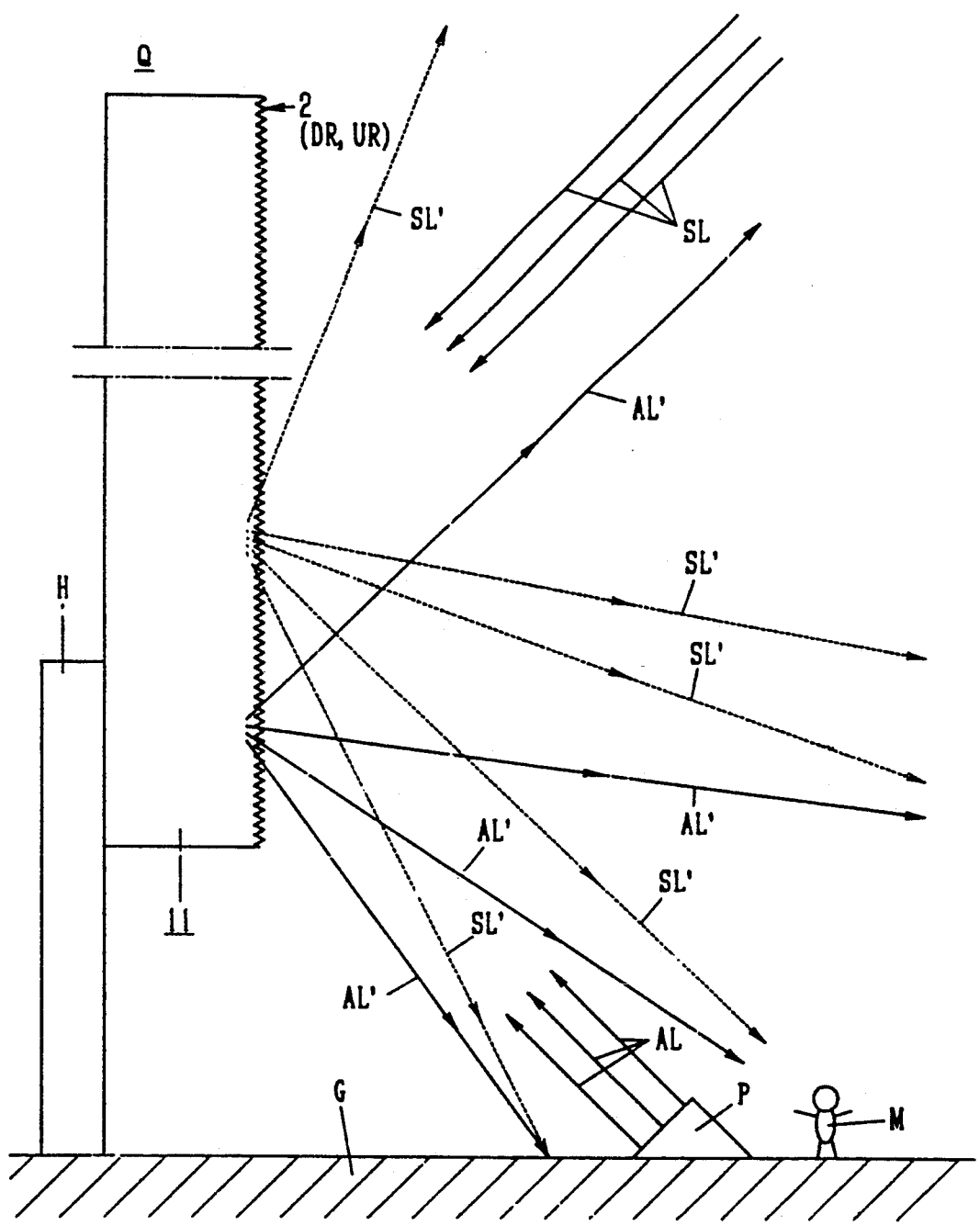
FIG. 25 is a schematic diagram for explaining conventional pseudo-luminous panel.

Turning next to FIG. 22 an embodiment of the matrix display device employing the display elements according to the present invention will be described.

The matrix display device MD of this embodiment has a construction in which a number of display elements E according to the ninth or tenth embodiment shown in FIG. 19 or 20 are arranged in a matrix form in a support frame 31.

According to the matrix display device MD of this embodiment, since each display element E is capable of changing the color of its display as mentioned above in respect of the ninth or tenth embodiment, a character, figure or like pattern can be displayed in a desired color in the daytime and at night.

The embodiments described above are merely illustrative of the present invention and should not be construed as limiting the invention specifically thereto. In the embodiments of the pseudo-luminous panels the obliquely upward band-like surface portions 3A of the optical color filter 1 can also be formed by smooth surfaces extending straight in the longitudinal section of the panel Q.

It will be apparent that many modifications and variations may be effected without departing from the scope of the novel concepts of the present invention.

What is claimed is:

1. A pseudo-luminous panel comprising:
an optical color filter; and
a reflecting film formed over the back face of said optical color filter;
wherein:
the surface of said optical color filter is composed of obliquely downward band-like surface portions and obliquely upward band-like surface portions alternately arranged side by side in a vertical direction;
the back face of said optical color filter is composed of obliquely upward band-like back face portions each on the opposite side from one of said obliquely downward band-like surface portions forming the surface of said optical color filter and obliquely downward band-like back face portions each on the opposite side from one of said obliquely upward band-like surface portions forming the surface of said optical color filter;
said obliquely upward band-like back face portions of said optical color filter are smooth surfaces;
said obliquely downward band-like back face portions of said optical color filter are smooth, irregular or uneven surfaces;
said obliquely downward band-like surface portions forming the surface of said optical color filter are smooth surfaces extending straight in the longitudinal section of said optical color filter; and
said obliquely upward band-like surface portions forming the surface of said optical color filter are rough surfaces.

2. A pseudo-luminous panel comprising:
an optical color filter; and
a reflecting film formed over the back of said optical color filter;
wherein:
the surface of said optical color filter is composed of obliquely downward band-like surface portions and obliquely upward band-like surface portions alternately arranged side by side in a vertical direction;
the back face of said optical color filter is composed of obliquely upward band-like back face portions each on the opposite side from one of said obliquely downward band-like surface portions forming the surface of said optical color filter and obliquely downward band-like back face portions each on the opposite side from one of said obliquely upward band-like surface portions forming the surface of said optical color filter;
said obliquely upward band-like back face portions of said optical color filter are smooth surfaces which are curved convex obliquely upward in the longitudinal section of said optical color filter;
said obliquely downward band-like back face portions of said optical color filter are smooth, irregular or uneven surfaces;
said obliquely downward band-like surface portions forming the surface of said optical color filter are smooth surfaces extending straight in the longitudinal section of said optical color filter; and
said obliquely upward band-like surface portions forming the surface of said optical color filter are rough surfaces.

3. The pseudo-luminous panel of claim 1 or 2 wherein said obliquely upward band-like back face portions of said optical color filter extend straight widthwise of the panel.

4. The pseudo-luminous panel of claim 1 or 2 wherein said obliquely upward band-like back face portions of said optical color filter are curved convex backward and arranged side by side widthwise of the panel.

5. An optical color filter,
wherein the surface of said optical color filter is composed of obliquely downward band-like surface portions and obliquely upward band-like surface portions alternately arranged side by side in a vertical direction;
the back face of said optical color filter is composed of obliquely upward band-like back face portions each on the opposite side from one of said obliquely downward band-like surface portions and obliquely downward band-like back face portions each on the opposite side from one of said obliquely upward band-like surface portions;
said obliquely upward band-like back face portions are each formed by a smooth surface;
said obliquely downward band-like back face portions are each formed by a smooth, irregular or uneven surface;
said obliquely downward band-like surface portions are each formed by a smooth surface which extends straight in the longitudinal section of the panel;
said obliquely upward band-like surface portions are each formed by a rough surface.

6. An optical color filter,
wherein the surface of said optical color filter is composed of obliquely downward band-like surface portions and obliquely upward band-like surface portions alternately arranged side by side in a vertical direction;
the back face of said optical color filter is composed of obliquely upward band-like back face portions each on the opposite side from one of said obliquely downward band-like surface portions and obliquely downward band-like back face portions each on the opposite side from one of said obliquely upward band-like surface portions;

said obliquely upward band-like back face portions are each formed by a smooth surface which is curved convex obliquely upward in the longitudinal section of the panel;

said obliquely downward band-like back face portions are each formed by a smooth, irregular or uneven surface;

said obliquely downward band-like surface portions are each formed by a smooth surface which extends straight in the longitudinal section of the panel;

said obliquely upward band-like surface portions are each formed by a rough surface.

7. The optical color filter of claim 5 or 6 wherein said obliquely upward band-like back face portions each extend straight widthwise of the panel.

8. The optical color filter of claim 5 or 6 wherein said obliquely upward band-like back face portions are each composed of face portions curved convex backward and arranged side by side widthwise of the panel.

9. A display element comprising:
a plurality of pseudo-luminous panels of claim 1 or 2;
wherein:
said plurality of pseudo-luminous panels are arranged on a support so that they are selectively displayed; and
optical color filters of said pseudo-luminous panels have different pass bands in terms of their band-pass characteristic.

10. A fixed matrix display device comprising:
a plurality of pseudo-luminous panels of claim 1 or 2;
wherein:
said plurality of pseudo-luminous panels are arranged in a matrix form on a support.

11. A matrix display device comprising:
a number of display elements arranged in a matrix form on a support;
wherein:
each of said display elements has a plurality of pseudo-luminous panels of claim 1 or 2;
said plurality of pseudo-luminous panels are arranged on a support so that they are selectively displayed; and
optical color filters of said plurality of pseudo-luminous panels have different pass bands in terms of their band-pass characteristic.

* * * * *

UNITED STATES PATENT AND TRADEMARK OFFICE
CERTIFICATE OF CORRECTION

PATENT NO. : 5,299,061
DATED : March 29, 1994
INVENTOR(S) : Yoshimasa Wakatake

It is certified that error appears in the above-identified patent and that said Letters Patent is hereby corrected as shown below:

On the title page, insert the following after item [22]:
  [30]    Foreign Application Priority Data Nov. 5, 1991 [JP] .................. 317561/91

Signed and Sealed this

Eighteenth Day of April, 1995

Attest:

BRUCE LEHMAN

Attesting Officer

*Commissioner of Patents and Trademarks*